United States Patent
Brundage et al.

(10) Patent No.: US 10,606,885 B2
(45) Date of Patent: Mar. 31, 2020

(54) DATA OBJECT CREATION AND RECOMMENDATION USING MACHINE LEARNING BASED ONLINE EVOLUTION

(71) Applicant: Evolv Technology Solutions, Inc., San Francisco, CA (US)

(72) Inventors: Myles Brundage, San Francisco, CA (US); Risto Miikkulainen, Stanford, CA (US)

(73) Assignee: Evolv Technology Solutions, Inc., San Francisco, CA (US)

( * ) Notice: Subject to any disclaimer, the term of this patent is extended or adjusted under 35 U.S.C. 154(b) by 226 days.

(21) Appl. No.: 15/813,041

(22) Filed: Nov. 14, 2017

(65) Prior Publication Data

US 2018/0137390 A1  May 17, 2018

Related U.S. Application Data

(60) Provisional application No. 62/422,497, filed on Nov. 15, 2016, provisional application No. 62/422,507, filed on Nov. 15, 2016.

(51) Int. Cl.
*G06F 16/583* (2019.01)
*G06N 20/00* (2019.01)
(Continued)

(52) U.S. Cl.
CPC ........ *G06F 16/5838* (2019.01); *G06F 16/583* (2019.01); *G06F 16/5854* (2019.01);
(Continued)

(58) Field of Classification Search
CPC ... G06F 16/5854; G06F 16/583; G06N 20/00; G06N 3/0454; G06N 3/084; G06N 3/086;
(Continued)

(56) References Cited

U.S. PATENT DOCUMENTS 9,417,917 B1 *  8/2016  Barber .................. G06F 9/5005
9,727,522 B1 *  8/2017  Barber .................. G06F 9/5016
(Continued)

OTHER PUBLICATIONS

Amati, Christina, et al., "Study of Image Colourfulness", Aug. 8-10, 2014, 9 pgs.
(Continued)

*Primary Examiner* — Edward Park
(74) *Attorney, Agent, or Firm* — Haynes Beffel & Wolfeld LLP; Warren S. Wolfeld; Andrew L. Dunlap

(57) ABSTRACT

The technology disclosed relates to providing expanded data object correlations for user-generated web customizations. Roughly described, it relates to creating an initial plurality of candidate data object image representations by procreation, storing a candidate population having the plurality of candidate data object image representations, scoring each of the candidate data object image representations for conformity with a predefined goal using a trained neural network system and/or a rule-based percept filter, discarding candidate data object image representations from the candidate population, adding new data object image representations to the candidate population by procreation, iterating the scoring, the discarding, and the adding until the discarding yields a candidate pool of candidate data object image representations not yet discarded but which satisfy a convergence condition, and providing as recommendation for display to a user at least one of the data object images represented in the candidate pool.

14 Claims, 19 Drawing Sheets

(51) Int. Cl.
*G06K 9/62* (2006.01)
*G06K 9/46* (2006.01)
*G06K 9/00* (2006.01)
*G06N 3/08* (2006.01)
*G06N 3/04* (2006.01)

(52) U.S. Cl.
CPC ....... *G06K 9/00624* (2013.01); *G06K 9/4628* (2013.01); *G06K 9/626* (2013.01); *G06K 9/6215* (2013.01); *G06K 9/6253* (2013.01); *G06K 9/6255* (2013.01); *G06K 9/6257* (2013.01); *G06K 9/6262* (2013.01); *G06K 9/6271* (2013.01); *G06N 3/0454* (2013.01); *G06N 3/084* (2013.01); *G06N 3/086* (2013.01); *G06N 20/00* (2019.01)

(58) Field of Classification Search
CPC ............. G06K 9/00624; G06K 9/4628; G06K 9/6215; G06K 9/6253; G06K 9/6255; G06K 9/6257; G06K 9/626; G06K 9/6262; G06K 9/6271
See application file for complete search history.

(56) References Cited

U.S. PATENT DOCUMENTS

| | | | |
|---|---|---|---|
| 9,811,470 B2* | 11/2017 | Benoit | G06F 12/0888 |
| 2015/0332087 A1 | 11/2015 | Joshi et al. | |
| 2015/0379959 A1 | 12/2015 | Dorner et al. | |
| 2016/0098844 A1 | 4/2016 | Shaji et al. | |
| 2016/0170982 A1 | 6/2016 | Djuric et al. | |
| 2016/0189396 A1 | 6/2016 | Kwong et al. | |
| 2016/0343058 A1 | 11/2016 | Levy et al. | |
| 2017/0011136 A1 | 1/2017 | Gabbai et al. | |
| 2017/0132510 A1 | 5/2017 | Paluri et al. | |

OTHER PUBLICATIONS

Datta, Ritendra, et al., "Studying Aesthetics in Photographic Images Using a Computational Approach", May 7-13, 2006, 15 pgs.
Desnoyer, Mark, et al., "Aesthetic Image Classification for Autonomous Agents", Aug. 2010, 5 pgs.
Hodjat, Babak, et al., "Distributed age-layered novelty search", 2016, 8 pgs.
Lehman, Joel, et al., "Abandoning Objectives: Evolution Through the Search for Novelty Alone", 2011, 35 pgs.
Mouret, J.-B., et al., "Encouraging Behavioral Diversity in Evolutionary Robotics: An Empirical Study", 2012, 43 pgs.
O'Donovan, Peter, "Learning Design: Aesthetic Models for Color, Layout and Typography", 2015, pp. 188.
Salge, Christoph, et al., "Changing the Environment based on Empowerment as Intrinsic Motivation Entropy", Feb. 2014, 31 pgs.
San Pedro, Jose, et al., "Ranking and Classifying Attractiveness of Photos in Folksonomies", Jan. 2009, 11 pgs.
Stanley, Kenneth, et al., "Why Greatness Cannot be Planned", May 7, 2015, 144 pgs.
PCT/IB17/57147—International Search Report and Written Opinion dated Apr. 20, 2018, 20 pages.
PCT/IB17/57147—International Preliminary Report on Patentability dated May 31, 2019, 9 pages.
U.S. Appl. No. 15/813,019—Office Action dated Sep. 19, 2019, 36 pages.
Wu S, et. al., "Personal recommendation using deep recurrent neural networks in NetEase", IEEE 32nd International Conference on Data Engineering (ICDE), May 16, 2016, pp. 1218-1229.

* cited by examiner

DATA OBJECT CREATION AND RECOMMENDATION USING OFFLINE EVOLVED CANDIDATE SPACE

DATA OBJECT CREATION AND RECOMMENDATION USING MACHINE LEARNING BASED ONLINE EVOLUTION

CROSS REFERENCE TO OTHER APPLICATIONS

This application claims the benefit of U.S. Provisional Patent Application No. 62/422,507, entitled "DATA OBJECT CREATION AND RECOMMENDATION USING MACHINE LEARNING BASED ONLINE EVOLUTION," filed on Nov. 15, 2016. The priority provisional application is hereby incorporated by reference for all purposes;

This application claims the benefit of U.S. Provisional Patent Application No. 62/422,497, entitled "DATA OBJECT CREATION AND RECOMMENDATION USING MACHINE LEARNING BASED OFFLINE EVOLUTION," filed on Nov. 15, 2016. The priority provisional application is hereby incorporated by reference for all purposes;

This application incorporates by reference for all purposes U.S. Nonprovisional patent application Ser. No. 15/813,019, entitled "DATA OBJECT CREATION AND RECOMMENDATION USING MACHINE LEARNING BASED OFFLINE EVOLUTION", filed contemporaneously herewith. The nonprovisional application is hereby incorporated by reference for all purposes;

This application incorporates by reference for all purposes U.S. Nonprovisional patent application Ser. No. 14/494,364, entitled "VISUAL INTERACTIVE SEARCH," filed on Sep. 23, 2014;

This application incorporates by reference for all purposes U.S. Nonprovisional patent application Ser. No. 15/295,926, entitled "VISUAL INTERACTIVE SEARCH, SCALABLE BANDIT-BASED VISUAL INTERACTIVE SEARCH AND RANKING FOR VISUAL INTERACTIVE SEARCH," filed on Oct. 17, 2016; and This application incorporates by reference for all purposes US Nonprovisional Patent Application No. 62/348,097, entitled "CONTENT EMBEDDING USING DEEP METRIC LEARNING ALGORITHMS," filed on Jun. 9, 2016.

FIELD OF THE TECHNOLOGY DISCLOSED

The technology disclosed relates to artificial intelligence type computers and digital data processing systems and corresponding data processing methods and products for emulation of intelligence (i.e., knowledge based systems, reasoning systems, and knowledge acquisition systems); and including systems for reasoning with uncertainty (e.g., fuzzy logic systems), adaptive systems, machine learning systems, and artificial neural networks. The technology disclosed further relates to machine learning-based systems and methods of preparing a data object creation and recommendation database for use by a data object creation and recommendation system.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Regarding "real-world data," one of the most challenging aspects of generating training data is that the training data should resemble an underlying distribution of "real-world data." "Real-world data" is data that is similar to what a user is trying to match when a user is presented with documents or images on a screen.

Roughly described, the technology disclosed relates to an overall process of providing a service using a trained model. The trained model uses algorithms for generating predictions in the form of images and/or screens that are believed to draw the customer to their target image (e.g., an image in their mind that they are trying to reach, such as a specific product). The images and/or screens are produced using embeddings created by the trained model.

The outcome of the service is only as good as the trained model. Use of better or more comprehensive training data allows for the creation of a better (e.g., more accurate or realistic) model, because the model is only as "smart" as the data that was used for training. This is why it is important to improve the training data generation process. Training data should satisfy two important aspects—(i) comprehensiveness, i.e., having richly tagged real-world images that are captured in a wide spectrum of uncontrolled environments (e.g., arbitrary perspectives, textures, backgrounds, occlusion, illumination) so that the model is proficient at handling a diverse array of image requests from the customers during production or inference and (ii) scale, i.e., having large amounts of such tagged real-world images so that the model is adequately trained. There exists a shortage of such training data because colleting and tagging real-world images is tedious, time consuming, and error prone.

Therefore, an opportunity arises for preparing a data object creation and recommendation database for use in a data object creation and recommendation system.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DETAILED DESCRIPTION

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other embodiments and applications without departing from the spirit and scope of the technology disclosed. Thus, the technology disclosed is not intended to be limited to the implementations shown, but is to be accorded the widest scope consistent with the principles and features disclosed herein.
Machine Learned Delivery Network (MLDN)

Figure 1:
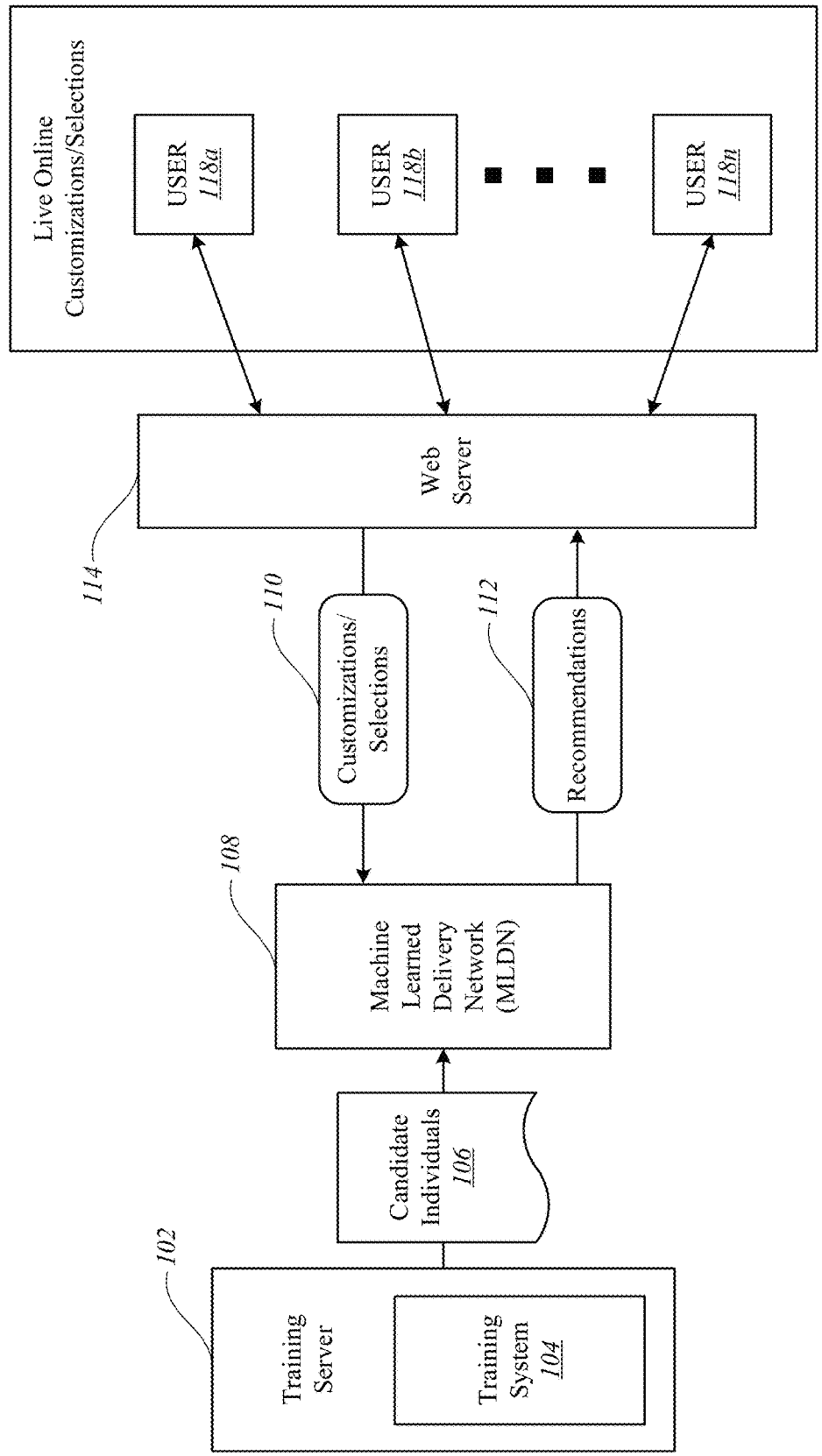
FIG. 1 illustrates an improved content delivery network (CDN), referred to herein as a machine learned delivery network (MLDN), which implements a data object creation and recommendation system.

FIG. 1 illustrates an improved content delivery network (CDN), referred to herein as a machine learned delivery network (MLDN) 108, which implements a data object creation and recommendation system. FIG. 1 also includes a training server 102 implementing a training system 104. FIG. 1 also includes candidate individuals 106, web server 114, and clients or client devices of users 118a-n. In relation to the client devices of users 118a-n, the terms "computer" or "mobile" or "tablet" refer herein to systems where the MLDN 108 can directly deliver HTTP and streaming media in the networking stack. In other implementations, the MLDN 108 indirectly delivers HTTP and streaming media to the client devices of users 118a-n via the web server 114. The training system 104 can be viewed as providing several functionalities; key among them are shown in FIGS. 2-7. In some implementations, the training server 102 and the MLDN 108 can be engines of varying types including workstations, servers, computing clusters, blade servers, server farms, or any other data processing systems or computing devices.

The interconnections of the elements of FIG. 1 are now described. A network couples the client devices of users 118a-n, the web server 114, the MLDN 108, and the training server 102 in communication (indicated by solid lines). The actual communication path can be point-to-point over public and/or private networks. All of the communications can occur over a variety of networks, e.g., private networks, VPN, MPLS circuit, direct network link, or Internet, or any combination thereof, and may use appropriate application programming interfaces (APIs) and data interchange formats, e.g., REST, JSON, XML, SOAP and/or JMS. This communication is generally over a network such as the Internet, inclusive of the mobile Internet, via protocols such as EDGE, 3G, LTE, Wi-Fi, and WiMAX.

Having described the elements of FIG. 1 and their interconnections, elements of the figure are now described in greater detail. The MLDN 108 is a self-organizing network of geographically distributed content delivery nodes (intentionally simplified to improve the clarity of the description), which are arranged for efficient delivery of digital content (e.g., graphics, images, streaming media, and applications) on behalf of third party content providers or vendors. A request from a requesting end user for given content is directed to a "best" replica, where "best" usually means that the item is served to the client quickly compared to the time it would take to fetch it from an origin server like the training server 102.

An entity that provides, hosts, implements, and/or operationalizes the MLDN 108 and the training server 102 is referred to herein as an artificial intelligence service provider (AISP). In some implementations, a single AISP operates the request-routers, the surrogates, and the content distributors. In addition, that AISP establishes business relationships with third party content publishers or vendors who access the training server 102 of the AISP via the MLDN 108 to implement a data object creation and recommendation system. In one implementation, the MLDN 108 is a cloud platform that interfaces with an application server or web server (e.g., that of third party content publishers or vendors). In some implementations, the MLDN 108 replaces a vendor's CDN in a web stack and is deployed in the same fashion as a CDN to perform content delivery functions. In other implementations, the MLDN 108 works in conjunction with a vendor's CDN. In some implementations, the MLDN 108 is agnostic to the kind of CDN used by the vendor.

In some implementations, the MLDN 108 is implemented as a combination of a content delivery infrastructure, a request-routing mechanism, and a distribution infrastructure. The content delivery infrastructure usually comprises a set of "surrogate" edge servers that are located at strategic locations (e.g., Internet Points of Presence, access points, and the like) for delivering copies of content to requesting end users. The request-routing mechanism allocates servers in the content delivery infrastructure to the requesting client devices of users 118a-n in a way that, for web content delivery, minimizes a given client's response time and, for streaming media delivery, provides for the highest quality. The distribution infrastructure consists of on-demand or push-based mechanisms that move content from the training server 102 to the surrogates. In one implementation, the MLDN 108 serves frequently-accessed content from a surrogate edge server that is optimal for a given requesting client. In one implementation, the MLDN 108 also includes network agents that monitor the network as well as the server loads. These network agents are typically co-located at third party data centers or other locations. In another implementation, a mapmaker software receives data generated from the network agents and periodically creates maps that dynamically associate IP addresses (e.g., the IP addresses of client-side local name servers) with the MLDN 108.

In one implementation, the MLDN 108 provides static content caching as well as dynamic content caching, or any combination thereof. With static content caching, the MLDN 108 caches static content, such as HTML files, images, Cascading Style Sheets (CS S), and JavaScript resources, so that they can be served on-demand directly from the Points of Presence (PoPs) of the MLDN 108. With dynamic content caching, the MLDN 108 continuously profiles website resources gathering data on the frequency with which they are updated. Examples of common CDN services today include Akamai™ CloudFlare™ CloudFront™, Fastly™, MaxCDN™, KeyCDN™, Incapsula™, and GlobalDots™.

The MLDN 108 receives customizations or selections 110 and generates recommendations 112 in dependence upon the candidate individuals 106. The recommendations, comprising data objects, are then delivered by the MLDN 108 using a content migrator or rewrite tool operated, for example, at a participating content provider server like the web server 114. The rewrite tool rewrites embedded object URLs (uniform resource locators) to point to the AISP domain. A request for such content is resolved through an AISP-managed domain name system (DNS) to identify a "best" region, and then to identify an edge server of the MLDN 108 within the region that is not overloaded and that is likely to host the requested webinterface (either control version or variation). In other implementations, the AISP can provide webinterface-specific metadata to the content servers like the web server 114 to determine how the content servers will handle a request for a webinterface being served by the MLDN 108. When a request for a webinterface is made, for example, by having an end user navigate to a site and select the URL through user-clicks, a DNS system like the web server 114 directs the name query (for whatever domain is in the URL) to the request routing mechanism of the MLDN 108. Once an edge server of the MLDN 108 is identified, the browser passes the webinterface request to the given edge server. The edge server retrieves a candidate individual from the training server 102 and generates a corresponding webinterface for graphical presentation to the users. Thus, the MLDN 108 generates hundreds, thousands, millions, or billions of data object recommendations in parallel and serves them individually to the requesting client devices of users 118*a-n*.

Training System

Figure 2:
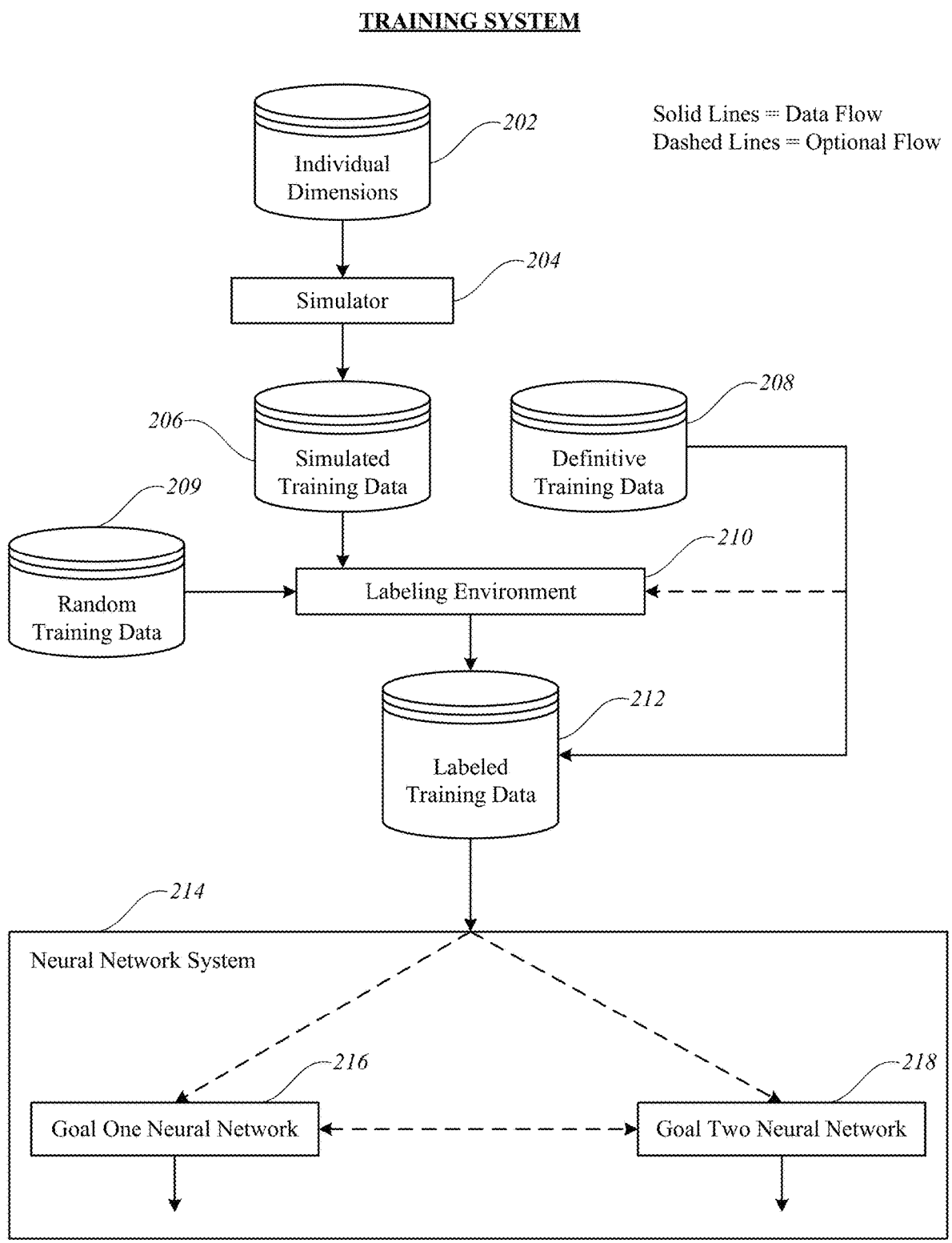
FIG. 2 is an overall diagram of an implementation of a training system that trains a neural network system for use in a data object creation and recommendation system.

FIG. 2 is an overall diagram of an implementation of a training system 104 that trains a neural network system 214 for use in a data object creation and recommendation system. FIG. 2 includes an individual dimensions database 202, a simulated training data database 206, a definitive training data database 208, a random training data 209, and a labeled training data database 212. As used herein, the term "database" does not necessarily imply any unity of structure. For example, two or more separate databases, when considered together, still constitute a "database," as that term is used herein. In some implementations, databases herein can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices.

FIG. 2 also includes a simulator 204, a labeling environment 210, and a neural network system 214. The neural network system 214 further includes a plurality of neural networks, such as a goal one neural network 216 and a goal two neural network 218. In other implementations, the training system 104 may not have the same elements as those listed above and/or may have other/different elements instead of, or in addition to, those listed above, such as an image pre-processing module, an image subsampling module, an image pooling module, and others.

Training

The neural network system 214 is configured through learning, which is referred to herein as a "training stage". During the training stage, the neural network system 214 processes/evaluates the training data and learns how to perform future processing/evaluation of production data (or validation data) during an "inference stage," i.e., data previously unseen during the training stage, by generalizing the information it learns in the training stage from the training data.

One problem that can occur when training a particularly complex neural network is overfitting. Overfitting occurs when a neural network simply memorizes the training data that it is provided, rather than generalizing well to new examples. Generally, the overfitting problem is increasingly likely to occur as the complexity of the neural network increases. Overfitting can be mitigated by providing the neural network with more training data. However, the collection of training data is a laborious and expensive task. Also, manually labeling images for detection is extremely time-consuming and error-prone.

To mitigate the foregoing issues, the training system 104 synthetically and automatically generates the simulated training data 206 using the individual dimensions database 202 and the simulator 204. In one implementation, the simulated training data 206 include data objects that are computationally modeled by providing the dimensions identified in the individual dimensions database 202 to the simulator 204. As used herein, a "data object" refers to a user-perceivable frontend including content like graphics, images, videos, streaming media, audio files, etc., representing a real-world entity, such as a product (e.g., shoes, clothes, sporting gear, gadgets, furniture, food items, wearables, accessories). In other implementations, a data object is a collection of dimensions that represent different attributes, components, parts, subcomponents, and/or subparts of the real-world entity. In implementations, data objects can be "web objects" that are included in websites and/or "native objects" that are locally interacted (e.g., CADD objects). Thus, a data object comprises, is identified by, includes, is represented by a set of dimensions and dimension values, properties and property values, attributes and attribute values, metadata and metadata values, components/sub-components and component/sub-component values, parts/sub-parts and part/sub-part values, a hierarchy or hierarchy values, a tree and branch values, or any other form of key-value pair that form the data object.

In one example, a shoe data object is a two-dimensional (2D) or three-dimensional (3D) representation of a shoe and the 2D or 3D dimensions comprising the shoe data object can include, for example, main dimensions, top dimensions, sole dimensions, back dimensions, and size dimensions. The main dimensions can include, for example, base material dimensions, stripes dimensions, and wording dimensions. The top dimensions can include, for example, shell toe dimensions, tongue logo dimensions, first pair laces dimensions, extra pair laces dimensions, and lining dimensions. The sole dimensions can include, for example, outsole dimensions. The back dimensions can include, for example, heel path dimensions and heel patch logo dimensions. The size dimensions can include, for example, gender dimensions and size dimensions. In some implementations, each of such dimensions is assigned a dimension value in dependence upon color, tone, brightness, contrast, texture, entity-type, material, etc. Other examples of dimensions and dimension values for an example shoe object pertain to laces, lace type, lace color, tongue label, outsole, midsole, right/left/top/bottom text, toe overlay, elastic gore, heel overlay, heel logo, and vamp. Yet other implementations include different data objects identifying 2D or 3D representations of different real-world entities having different dimensions and dimension values, such as an umbrella, a dress, a laptop, a cellphone, a watch, and the like.

The simulator 204 creates the simulated training data 206 by automatically generating synthetic data objects that are used to train the neural network system 214. In one implementation, the simulator 204 takes as input, dimensions and dimension values specified in the individual dimensions database 202 and applies permutation and combination operations to each of the specified dimensions and dimension values to generate new dimensions and dimension values. The output of the simulator 204 is synthetic data objects, which can be 2D or 3D representations of a real-world entity identified by the specified dimensions and dimension values. In other implementations, the simulator 204 uses 3D computer-aided design and drafting (CADD) models with digital annotations (e.g., PASCAL 3D+) to create the synthetic data objects for the simulated training data 206. In yet other implementations, the simulator 204 uses crowdsourced 3D models (e.g., ShapeNet), which include common daily objects with categorization labels, to generate the simulated training data 206.

The definitive training data 208 include conforming and/or non-conforming real-world images of a real-world entity (e.g., shoes). In one implementation, the conforming portion of the definitive training data 208 includes real-world images identified, labeled, annotated, and/or determined to be representing a "product brand" (e.g., Adidas™ shoes). In contrast, according to one implementation, the non-conforming portion of the definitive training data 208 includes real-world images identified, labeled, annotated, and/or determined to be not representing the product brand (e.g., non-Adidas™ shoes, such as Nike™ shoes). In some implementations, the conforming portion of the definitive training data 208 (e.g., product brand images) is also used to create a set of target image representations, which are used to set one or more predefined goals for the neural network system 214.

The random training data 209 includes real-world images of a real-world entity (e.g., shoes) that are not yet identified, labeled, annotated, and/or determined as being conforming and/or non-conforming to a set of target identities or representations, such as the product brand (e.g., Adidas™ shoes).

The labeling environment 210 is used to determine whether and/or to what degree the simulated training data 206 and the random training data 209 conform or do not conform to a set of target identities or image representations of a data object, such as the product brand (e.g., Adidas™ shoes), according to one implementation. In some implementations, the labeling environment 210 uses crowdsource intelligence facilitated by human annotation services like Amazon Mechanical Turk™ and CrowdFlower™, as further discussed below.

Definitive Metrics

In another implementation, the labeling environment 210 is used to determine whether and/or to what degree the simulated training data 206 and the random training data 209 conform or do not conform to a set of target identities or image representations of a data object, such as the product brand (e.g., Adidas™ shoes) in dependence upon a plurality of and/or a set of definitive metrics. The definitive metrics identify a persona for the target identities or image representations of the data object using various dimensions, dimension values, attributes, components, parts, subcomponents, and/or subparts of the real-world entity being represented by the data object, as they are represented in the image representations of the data object using image features and/or image vectors.

For example, the definitive metrics can identify a profile of a data object (e.g., shoe model or type) based on 2D or 3D dimensions, such as main dimensions, top dimensions, sole dimensions, back dimensions, and size dimensions. The main dimensions can include, for example, base material dimensions, stripes dimensions, and wording dimensions. The top dimensions can include, for example, shell toe dimensions, tongue logo dimensions, first pair laces dimensions, extra pair laces dimensions, and lining dimensions. The sole dimensions can include, for example, outsole dimensions. The back dimensions can include, for example, heel path dimensions and heel patch logo dimensions. The size dimensions can include, for example, gender dimensions and size dimensions. In some implementations, each of such dimensions are assigned a dimension value in dependence upon color, brightness, contrast, texture, entity-type, material, etc.

In one example implementation, two profiles of respective data objects (e.g., shoe models or types) differ in "type" if they differ in at least one dimension. In another example implementation, two profiles of respective data objects (e.g., shoe models or types) differ in "type" if they differ in at least one dimension value. In implementations, a collection of all the profiles of data objects belonging to a particular product brand (e.g., data objects having certain number of matching dimensions such as a matching logo dimension, and/or certain number of matching dimension values) are grouped in a persona representing the entire product brand.

In other implementations, 2D or 3D dimensions, dimension values, attributes, components, parts, subcomponents, and/or subparts of different real-world entities (e.g., clothes, sporting gear, gadgets, furniture, food items, wearables, accessories) are used by the definitive metrics to identify their profiles.

Perception Metrics

In yet another implementation, the labeling environment 210 is used to determine aesthetics and/or attractiveness of the data object representations in the simulated training data 206, the random training data 209, and/or the definitive training data 208 in dependence upon a plurality of and/or a set of perception metrics. The perception metrics are used to classify the data object representations in the simulated training data 206, the random training data 209, and/or the definitive training data 208 as being sufficiently aesthetic and/or attractive. The perception metrics can be based on theories of neuroaesthetics that rely on empirical aesthetic perceptions that give rise to aesthetic judgments, on color theories that rely on attributes, such as hue templates, color entropy, color coherence, color harmonies, color applications, colorfulness, number of colors, color themes, color schemes, color emotions, color combinations, color matching, color palettes and wheels (identifying, for example, complementary colors, analogous colors, triadic colors, split-complementary colors), vividness, etc., and on image aesthetic theories that rely on attributes, such as image sharpness and image entropy.

For additional information regarding the perception metrics, reference can be made to, for example, DATTA, R., JOSHI, D., LI, J., AND WANG, J. Z. 2006. Studying aesthetics in photographic images using a computational approach. In *Proceedings of the 9th European Conference on Computer Vision—Volume Part III*, Springer-Verlag, Berlin, Heidelberg, 288-301; SAN PEDRO, J., AND SIERS-DORFER, S. 2009. Ranking and classifying attractiveness of photos in folksonomies. In *Proc. of the 18th International Conf. on World Wide Web*, ACM, 771-780; SCHLOSS, K. B., AND PALMER, S. E. 2010. Aesthetics of color combinations. In *Human Vision and Electronic Imaging*, SPIE, vol. 7527 of *SPIE Proceedings*, 752719; DESNOYER, M., AND WETTERGREEN, D. 2010. Aesthetic image classification for autonomous agents. In *ICPR*. IEEE, 3452-3455; AMATI, C., MITRA, N., AND WEYRICH, T. 2014. A study of image colorfulness. In *Computational Aesthetics*; and O'DONOVAN, P. 2015. Learning design: Aesthetic models for color, layout and typography. University of Toronto, which are incorporated by reference for all purposes as if fully set forth herein.

In some implementations, the labeling environment 210 uses crowdsource intelligence facilitated by human annotation services like Amazon Mechanical Turk™ and CrowdFlower™. In one implementation, a heterogeneous pool of human workers of Amazon Mechanical Turk™ and CrowdFlower™, with great variation of taste, expertise, background, and age, determine whether and/or to what degree each of the data object image representations in the simulated training data 206 and/or the random training data 209 conform with the target identities or image representations of a data object, such as the product brand (e.g., Adidas™ shoes). The human annotation can be based on the definitive metrics and various dimensions, dimension values, attributes, components, parts, subcomponents, and/or subparts of the real-world entity, as they are represented in the data object representations using image features and/or image vectors.

In one implementation, the conforming data object image representations (e.g., images of Adidas™ shoes) can be humanly annotated as "BRAND-LIKE," "TRUE," or "YES" and the non-conforming data object image representations (e.g., images of non-Adidas™ shoes, such as Nike™ shoes) can be humanly annotated as "UNLIKE-BRAND," "FALSE," or "NO". In another implementation, the conforming data object image representations (e.g., images of Adidas™ shoes) can be humanly assigned a superior conformity level/score and the non-conforming data object image representations (e.g., images of non-Adidas™ shoes, such as Nike™ shoes) can be humanly assigned an inferior conformity level/score. In other implementations, the human labeling and/or annotations can be made using other schemes relying on different data types, such as quantitative or numerical data type, qualitative data type, discreet data type, continuous data type (with lower and upper bounds), integers data type (with lower and upper bounds), binary data type (0 or 1), nominal data type, ordinal or ranked data type, categorical data type, interval data type, and/or ratio data type.

In some implementations, the labeling environment 210 uses crowdsource intelligence facilitated by the human annotation services like Amazon Mechanical Turk™ and CrowdFlower™ to determine a degree of aesthetics and/or attractiveness of the data object representations in the simulated training data 206, the random training data 209, and/or the definitive training data 208 in dependence upon the perception metrics. In one implementation, the attractive data object image representations can be humanly annotated as "ATTRACTIVE," "TRUE," or "YES" and the unattractive data object image representations can be humanly annotated as "UNATTRACTIVE," "FALSE," or "NO". In another implementation, the attractive data object image representations can be humanly assigned a superior attraction/aesthetics level/score and the unattractive data object image representations can be humanly assigned an inferior attraction/aesthetics level/score. In other implementations, the human labeling and/or annotations can be made using other schemes relying on different data types, such as quantitative or numerical data type, qualitative data type, discreet data type, continuous data type (with lower and upper bounds), integers data type (with lower and upper bounds), binary data type (0 or 1), nominal data type, ordinal or ranked data type, categorical data type, interval data type, and/or ratio data type.

In some implementations, the human workers can be provided with perception metrics-based rules that the human workers can use to label and/or annotate the data object representations with attractiveness labels. The human annotation can be based on various dimensions, dimension values, attributes, components, parts, subcomponents, and/or subparts of the real-world entity being represented by the data object, as they are represented in the image representations of the data object using image features and/or image vectors. For instance, the perception metrics-based rules can define combinations of colors or color palettes that are pre-determined to identify a data object as attractive (e.g., images of shoes with Black and Burgundy colors). In another example, the perception metrics-based rules can define an upper and/or lower count of colors that are pre-determined to identify a data object as attractive (e.g., images of shoes with no more than three colors). In yet another example, the perception metrics-based rules can define an entropy level that is pre-determined to identify a data object as attractive (e.g., images of shoes with a certain entropy score or above or below a certain entropy score). In yet further implementation, the perception metrics-based rules can define dimension and dimension values that are pre-determined to identify a data object as attractive (e.g., images of shoes with wide sole and a tongue logo).

Percept Filter

Figure 3:
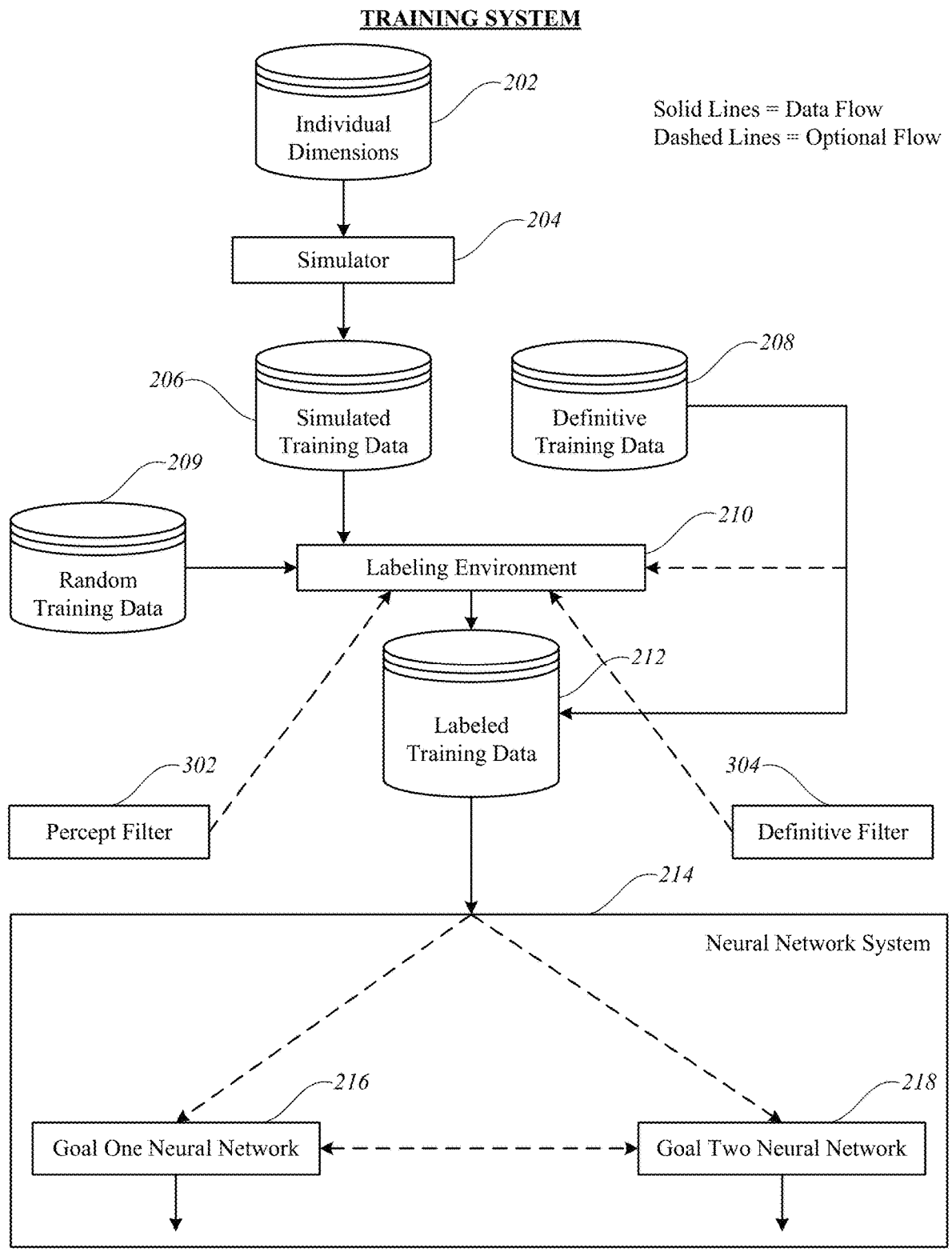
FIG. 3 illustrates an overall diagram of one implementation of a training system with a rule-based percept filter and/or a rule-based definitive filter that trains a neural network system for use in a data object creation and recommendation system.

FIG. 3 illustrates an overall diagram of one implementation of a training system 104 with a rule-based percept filter 302 and/or a rule-based definitive filter 304 that trains a neural network system 214 for use in a data object creation and recommendation system. The rule-based percept filter 302 evaluates image features of the image representations in the simulated training data 206, the random training data 209, and/or the definitive training data 208 based on the perception metrics (discussed above) to assign the image representations an aesthetic or attractiveness score and/or label them as attractive or unattractive. In one implementation, the data object image representations can be automatically assigned an "attractiveness score," which, in some implementations, can numerically or categorically distinguish more attractive data object image representations from less attractive data object image representations. In another implementation, the attractive data object image representations can be automatically annotated as "ATTRACTIVE," "TRUE," or "YES" and the unattractive data object image representations can be automatically annotated as "UNATTRACTIVE," "FALSE," or "NO". In yet another implementation, the attractive data object image representations can be automatically assigned a superior attraction/aesthetics level/score and the unattractive data object image representations can be automatically assigned an inferior attraction/aesthetics level/score. In other implementations, the automatic labeling and/or annotations can be made using other schemes relying on different data types, such as quantitative or numerical data type, qualitative data type, discreet data type, continuous data type (with lower and upper bounds), integers data type (with lower and upper bounds), binary data type (0 or 1), nominal data type, ordinal or ranked data type, categorical data type, interval data type, and/or ratio data type.

In some implementations, the rule-based percept filter 302 can be provided with perception metrics-based rules defined by humans, which the rule-based percept filter 302 can use to automatically label and/or annotate the data object representations with attractiveness labels. The automatic annotation implemented by the rule-based percept filter 302 can be based on various dimensions, dimension values, attributes, components, parts, subcomponents, and/or subparts of the real-world entity being represented by the data object, as they are represented in the image representations of the data object using image features and/or image vectors. For instance, the rule-based percept filter 302 can be configured with perception metrics-based rules which define combinations of colors or color palettes that are pre-determined to identify a data object as attractive (e.g., images of shoes with Black and Burgundy colors). In another example, the rule-based percept filter 302 can be configured with perception metrics-based rules which define an upper and/or lower count of colors that are pre-determined to identify a data object as attractive (e.g., images of shoes with no more than three colors). In yet another example, the rule-based percept filter 302 can be configured with perception metrics-based rules which define an entropy level that is pre-determined to identify a data object as attractive (e.g., images of shoes with a or above or below a certain entropy score). In yet further implementation, the rule-based percept filter 302 can be configured with perception metrics-based rules which define dimension and dimension values that are pre-determined to identify a data object as attractive (e.g., images of shoes with wide sole and a tongue logo).

Definitive Filter

The rule-based definitive filter 304 evaluates image features of the image representations in the simulated training data 206, the random training data 209, and/or the definitive training data 208 based on the definitive metrics, the data object profiles, and the product brand persona (discussed above) to identify the image representations as conforming or non-conforming to a set of target identities or image representations of a data object, such as the product brand (e.g., Adidas™ shoes). In some implementation, the definitive metrics are identified and set by humans.

In implementations, the rule-based definitive filter 304 compares the image representations in the simulated training data 206, the random training data 209, and/or the definitive training data 208 to the persona representing the entire product brand and determines which image representations match with a data object profile of at least one model or type of the product brand. In one implementation, the data object image representations can be automatically assigned a "conformity or brand-likeness score," which, in some implementations, can numerically or categorically distinguish more conforming data object image representations from less conforming data object image representations. In another implementation, the matching/conforming image representations can be automatically annotated as "BRAND-LIKE," "TRUE," or "YES" and the non-matching/non-conforming image representations can be automatically annotated as "UNLIKE-BRAND," "FALSE," or "NO". In yet another implementation, the conforming data object image representations can be automatically assigned a superior conforming level/score and the non-conforming data object image representations can be automatically assigned an inferior conforming level/score. In other implementations, the automatic labeling and/or annotations can be made using other schemes relying on different data types, such as quantitative or numerical data type, qualitative data type, discreet data type, continuous data type (with lower and upper bounds), integers data type (with lower and upper bounds), binary data type (0 or 1), nominal data type, ordinal or ranked data type, categorical data type, interval data type, and/or ratio data type.

In one implementation, the data object image representations in the definitive training data 208 do not need labeling and/or annotation because they are provided by a "brand owner" (e.g., Adidas™), and are pre-determined or pre-identified as representing the product brand (e.g., Adidas™ shoes) and/or being attractive. In another implementation, the data object image representations in the definitive training data 208 are also subjected to labeling and/or annotation in the labeling environment 210.

Labeled training data 212 stores a combination of the simulated training data 206 and the random training data 209 after they have been labeled and/or annotated by the labeling environment 210 and the definitive training data 208 with conforming and/or non-conforming real-world images. In implementations, the labeled training data 212 includes a plurality of preliminary data object images provided by the simulated training data 206, the random training data 209, and/or the definitive training data 208. The preliminary data object images in the labeled training data 212 provide a representation of the images with a respective conformity parameter indicating level of conformity of the images with a predefined goal. The conformity parameter is set in dependence upon the human or machine-learned annotations made to the image representations in the labeling environment 210.

Neural Network System

Neural network system 214 includes a plurality of neural networks like the goal one neural network 216 and the goal two neural network 218, which are trained to achieve conformity with different predefined goals in dependence upon respective thresholds. The neural networks used by the neural network system 214 can be any type of neural networks. In one implementation, a neural network included in the neural network system 214 is a and/or comprises a so-called "module," "sub-module," "supermodule," and/or "blueprint".

As used herein, the term "module" refers to a processor that receives information characterizing input data and generates an alternative representation and/or characterization of the input data. Examples of a module include a multilayer perceptron, a feed-forward neural network, a recurrent or recursive neural network, a deep neural network, a shallow neural network, a fully-connected neural network, a sparsely-connected neural network, a convolutional neural network that comprises a fully-connected neural network, a fully convolutional network without a fully-connected neural network, a deep stacking neural network, a deep belief network, a residual network, an echo state network, a liquid state machine, a highway network, a LSTM (long short-term memory) network, and a pre-trained and frozen neural network.

In other implementations, the term "module" is used herein (e.g., in FIGS. 5 and 7) to refer to processing units that implement various stages of evolution implemented by a genetic algorithm, such as initialization, evaluation, competition, procreation, harvesting, and so on.

Yet other examples of a module include individual components of a convolutional neural network, such as a one-dimensional (1D) convolution module, a two-dimensional (2D) convolution module, a three-dimensional (3D) convolution module, a feature extraction module, a dimensionality reduction module, a pooling module, a subsampling module, a batch normalization module, a concatenation module, a classification module, and a regularization module.

In implementations, a module is a pre-processing module, such as an input module, a normalization module, a patch-extraction module, and a noise-addition module. In implementations, a module is a post-processing module, such as an output module, an estimation module, and a modelling module.

In implementations, a module is a classification module. Some examples of classifiers used by the technology disclosed include a multi-class support vector machine (SVM), a Softmax classifier, and a multinomial logistic regressor. Other examples of classifiers used by the technology disclosed include a rule-based classifier.

In implementations, a module comprises learnable sub-modules, parameters, and hyperparameters that can be trained by back-propagating the errors using an optimization algorithm. The optimization algorithm can be based on stochastic gradient descent (or other variations of gradient descent like batch gradient descent and mini-batch gradient descent). Some examples of optimization algorithms used by the technology disclosed include Momentum, Nesterov accelerated gradient, Adagrad, Adadelta, RMSprop, and Adam. In other implementations, other techniques can be used to train a module, such as a universal approximation theorem, a rough set theory, and a counter-propagation algorithm.

In implementations, a module is an activation module that applies a non-linearity function. Some examples of non-linearity functions used by the technology disclosed include a sigmoid function, rectified linear units (ReLUs), hyperbolic tangent function, absolute of hyperbolic tangent function, leaky ReLUs (LReLUs), and parametrized ReLUs (PReLUs).

Two modules differ in "type" if they differ in at least one sub-module, parameter, or hyperparameter.

In implementations, a module comprises sub-modules, parameters, and hyperparameters that can be evolved using genetic algorithms (GAs). Modules need not all include a local learning capability, nor need they all include any sub-modules, parameters, and hyperparameters, which can be altered during operation of the GA. Preferably some, and more preferably all, of the modules are neural networks, which can learn their internal weights and which are responsive to sub-modules, parameters, and hyperparameters that can be altered during operation of the GA.

In some implementations, certain modules are fixed topology modules in which a certain set of sub-modules are not evolved/modified and/or only evolved/modified in certain generations, and only the interconnections or interconnects and interconnection weights between the sub-modules are evolved.

As used herein, the term "sub-module" refers to a processing element of a module. For example, in the case of a fully-connected neural network, a sub-module is a neuron of the neural network. In another example, a layer of neurons, i.e., a neuron layer, is considered a sub-module of the fully-connected neural network module. In other examples, in the case of a convolutional neural network, a kernel, a filter, a feature extractor, an activation function, a pooling operation, a subsampling operation, and a regularization operation, are each considered sub-modules of the convolutional neural network module. In some implementations, the sub-modules are considered as modules, and vice-versa.

As used herein, the term "supermodule" refers to a sequence, arrangement, composition, and/or cascades of one or more modules. In a supermodule, the modules are arranged in a sequence from lowest to highest or from nearest to farthest or from beginning to end or from first to last, and the information characterizing the input data is processed through each of the modules in the sequence. In some implementations, certain supermodules are fixed topology supermodules in which a certain set of modules are not evolved/modified and/or only evolved/modified in certain generations, and only the interconnections and interconnection weights between the modules are evolved.

As used herein, the term "blueprint" refers to a sequence, arrangement, composition, and/or cascades of one or more supermodules. In a blueprint, the supermodules are arranged in a sequence from lowest to highest or from nearest to farthest or from beginning to end or from first to last, and the information characterizing the input data is processed through each of the supermodules in the sequence. In some implementations, certain blueprints are fixed topology blueprints in which a certain set of supermodules are not evolved/modified and/or only evolved/modified in certain generations, and only the interconnections and interconnection weights between the supermodules are evolved.

Any other conventional or future-developed neural networks or components thereof or used therein, are considered to be modules, sub-modules, supermodules, and/or blueprints. Such implementations will be readily apparent to those skilled in the art without departing from the spirit and scope of the technology disclosed.

In implementations of the technology disclosed, any machine-learning system and/or algorithm can be used with varying degrees of complexity. For example, some implementations can include a single-module neural network trained with just back-propagation, without any genetic algorithm-based evolution.

In one implementation, the goal one neural network 216 and the goal two neural network 218 are trained to evaluate future data object image representations during the inference stage for conformity with different predefined goals. In one example, the goal one neural network 216 evaluates visual similarity of image features of the data object image representations with image features of a set of target image representations. In this example, the goal one neural network 216 is trained to determine whether the image representations in the production data (or validation data) conform to a set of target identities or image representations of a data object, such as the product brand (e.g., Adidas™ shoes).

In supervised training, the inputs and the desired outputs are provided to the goal one neural network 216. The inputs to the goal one neural network 216 are the data object representations from the labeled training data 212. The desired outputs to the goal one neural network 216 are the conformity parameters (set in dependence upon the human or machine-learned annotations made to the image representations in the labeling environment 210), which indicate level of conformity of the images in the labeled training data 212 with images of the product brand (e.g., Adidas™ shoes).

The goal one neural network 216 then processes the inputs and compares its actual outputs against the desired outputs. If the actual outputs do not match the desired outputs (e.g., network 216 determines that an image labeled as conforming is non-conforming, or vice-versa), errors are propagated back through the goal one neural network 216, causing the goal one neural network 216 to adjust its modules and/or sub-modules (e.g., interconnection weights). With increasing amounts of data (i.e., inputs and desired outputs), the goal one neural network 216 refines its modules and/or sub-modules (e.g., interconnection weights) to make improved evaluations, estimations, predictions, probabilities, class probability estimates, and/or classifications whether and/or to what degree the image representations provided to it conform to the target identities or image representations of a data object, such as the product brand (e.g., Adidas™ shoes).

Accordingly, the actual output error, propagated from the current input set of image representations, is compared with the desired outputs and the required compensations are transmitted to adjust the modules and/or sub-modules (e.g., interconnection weights) of the network 216 so that the error can be reduced at the next iteration. When the goal one neural network 216 has been adequately trained (e.g., a pre-set error threshold is reached or minimized), the modules and/or sub-modules (e.g., interconnection weights) can be fixed or frozen, or the goal one neural network 216 can continue to learn and refine while in use during the production or inference stage.

In another example, the goal two neural network 218 evaluates visual conformance of image features of the data object image representations in accordance with the perception metrics (discussed above). In this example, the goal two neural network 218 is trained to determine whether the image representations in the production data (or validation data) are aesthetically attractive.

In supervised training, the inputs and the desired outputs are provided to the goal two neural network 218. The inputs to the goal two neural network 218 are the data object representations from the labeled training data 212. The desired outputs to the goal two neural network 218 are the conformity parameters (set in dependence upon the human or machine-learned annotations made to the image representations in the labeling environment 210), which indicate whether and/or to what degree images in the labeled training data 212 are aesthetically attractive based on the perception metrics (discussed above).

The goal two neural network 218 then processes the inputs and compares its actual outputs against the desired outputs. If the actual outputs do not agree with the desired outputs (e.g., network 218 determines that an image labeled as unattractive is attractive, or vice-versa), errors are propagated back through the goal two neural network 218, causing the goal two neural network 218 to adjust its modules and/or sub-modules (e.g., interconnection weights). With increasing amounts of data (i.e., inputs and desired outputs), the goal two neural network 218 refines its modules and/or sub-modules (e.g., interconnection weights) to make improved evaluations, estimations, predictions, probabilities, class probability estimates, and/or classifications whether and/or to what degree the image representations provided to it are attractive. When the goal two neural network 218 has been adequately trained, the modules and/or sub-modules (e.g., interconnection weights) can be fixed or frozen, or the goal two neural network 218 can continue to learn and refine while in use during the production or inference stage.

Accordingly, the actual output error, propagated from the current input set of image representations, is compared with the desired outputs and the required compensations are transmitted to adjust the modules and/or sub-modules (e.g., interconnection weights) of the network 218 so that the error can be reduced at the next iteration. When the goal two neural network 218 has been adequately trained (e.g., a pre-set error threshold is reached or minimized), the modules and/or sub-modules (e.g., interconnection weights) can be fixed or frozen, or the goal two neural network 218 can continue to learn and refine while in use during the production or inference stage.

The technology disclosed, in other implementations, may not use neural networks, as those discussed above, and/or may use other/different machine learning-based systems and algorithms instead of, or in addition to, those listed above, such as support vector machines (SVM), hidden Markov models, Naïve Bayes classifier, adaptive Bayes classifier, decision trees, random forest, discriminant analysis, nearest neighbors (k-NN), linear regression, nonlinear regression, generalized linear models, adaptive neuro-fuzzy inference system, and others. In implementations of the technology, such other machine learning-based systems and algorithms can be trained to evaluate future data objects for conformity with predefined goals such as conformity with target identities or image representations of a data object, such as the product brand (e.g., Adidas™ shoes), attractiveness, novelty, and others.

Production—Offline Candidate Space

Offline candidate space 408 is created systematically without using a genetic algorithm. In one example, the offline candidate space 408 is created by processing the production data 401 or portions thereof through the rule-based percept filter 302, the rule-based definitive filter 304, the trained goal one neural network 216, and the trained goal two neural network 218. In another example, the offline candidate space 408 is created in dependence upon at least one starter data object and its starter dimensions and starter dimension values. In one implementation, the starter data object and its starter dimensions and starter dimension values are created, designed, or selected by a user or a designer. In another implementation, the offline candidate space 408 is created by randomly choosing an available value for a set of dimensions in the production data 401. In yet another implementation, the offline candidate space 408 is created in a maximally uniform manner across the distribution of an available set of dimension values in dependence upon a predetermined number of candidate individuals to be created.

Figure 4:
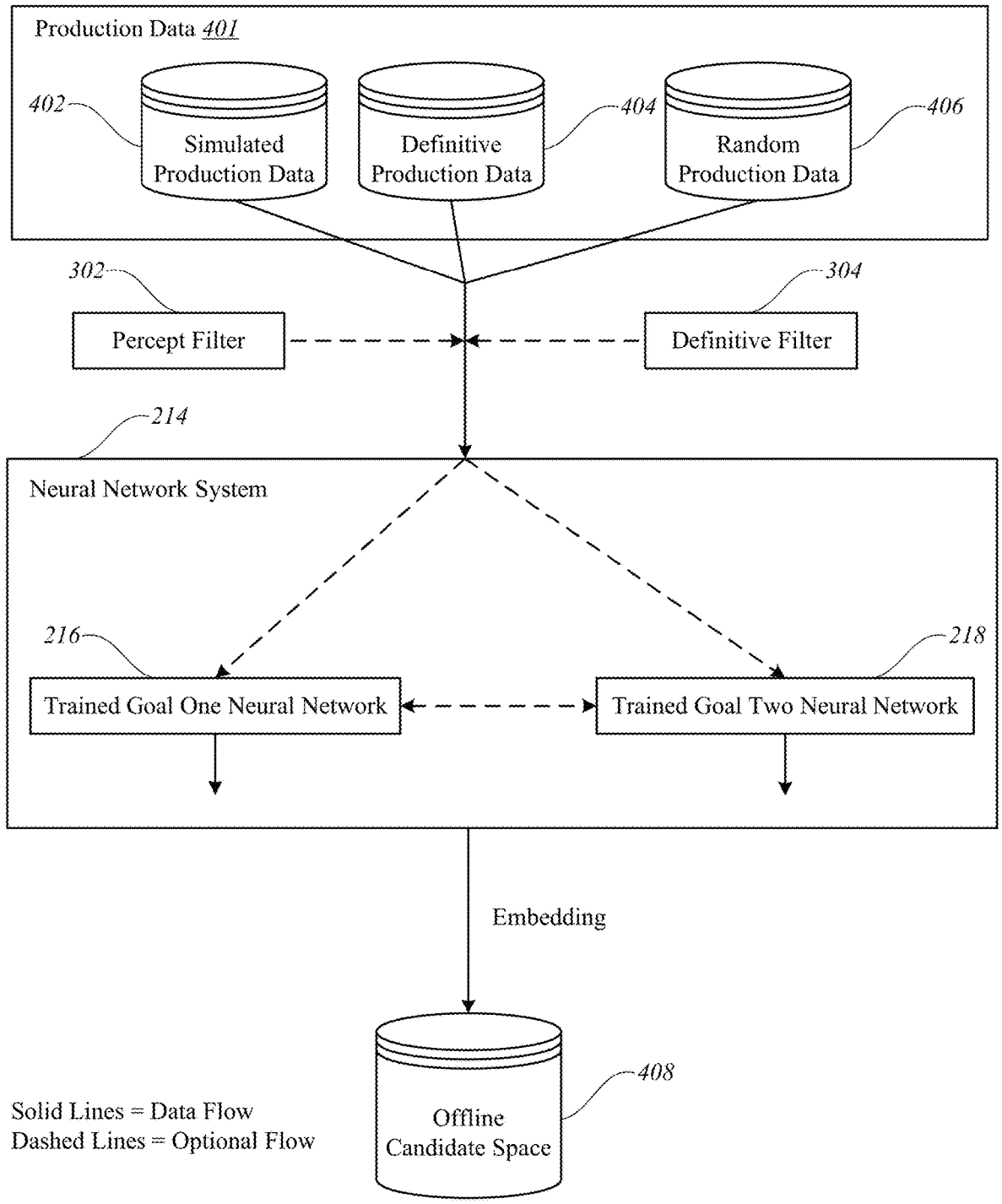
FIG. 4 depicts modules that can be used for offline creation of a candidate space by a training system that includes a trained neural network system and/or a rule-based percept filter and/or a rule-based definitive filter.

FIG. 4 depicts modules that can be used for offline creation of a candidate space by the training system 104 that includes a trained neural network system 214 and/or a rule-based percept filter 302 and/or a rule-based definitive filter 304. Once the neural networks in the neural network system 214 are trained, the neural network system 214 is provided with the production data 401 (also referred herein as "secondary data object image representations") during the production or inference stage. In one implementation, the production data 401 refers to data or image representations that the trained neural network system 214 and/or a rule-based percept filter 302 and/or a rule-based definitive filter 304 have not seen before or have not been provided during the training stage. In another implementation, the production data 401 refers to data or image representations that have not been labeled and/or annotated with a respective conformity parameter (e.g., using the labeling environment 210). In implementations, the production data 401 includes simulated production data 402, definitive production data 404, and random production data 406 (which are respectively similar to simulated training data 206, definitive training data 208, and random training data 209 with respect to being simulated, definitive, and random, but differ with respect to being production data, rather than being training data).

During the production or inference stage, the trained goal one neural network 216 and the trained goal two neural network 218 evaluate data object image representations in the production data 401 to determine conformity of the data object image representations with respective predefined goals. Of course, the neural network system 214 can include additional or fewer trained neural networks that are trained on a variety of predefined goals (e.g., gesture recognition, speech recognition, natural language processing, multivariate testing, pattern recognition, online media recommendation, and so on).

In one example, the trained goal one neural network 216 takes as input the data object image representations in the production data 401 and generates an output that identifies whether and/or to what degree the image representations conform to a set of target identities or image representations of a data object, such as the product brand (e.g., Adidas™ shoes). Thus, for instance, when goal one neural network 216 is trained during the training stage to classify image representations as being either Adidas™ shoes or non-Adidas™ shoes, during the production or inference stage, it can identify which of the unclassified images in the production data 401 conform to, are visually similar to, correspond to, or match Adidas™ shoes.

The output of the network 216 can be an evaluation, estimation, prediction, and/or classification expressed using quantitative or numerical data type, qualitative data type, discreet data type, continuous data type (with lower and upper bounds), integers data type (with lower and upper bounds), binary data type (0 or 1), nominal data type, ordinal or ranked data type, categorical data type, interval data type, and/or ratio data type.

In one implementation, the trained goal one neural network 216 determines that a subset of the production data 401 visually conforms to the images of the product brand. In another implementation, based on a threshold that applies to a conformance measure indicated in the output of the trained goal one neural network 216, a pool of best conforming data object image representations from the conforming subset is selected and stored by embedding the pool in an embedding space (e.g., offline candidate space 408). In some implementations, the embedding space is a metric or vector space where the image representations in the pool are stored along with corresponding data object images.

In another example, the trained goal two neural network 218 takes as input the data object image representations in the production data 401 and generates an output that identifies whether and/or to what degree the image representations are attractive. Thus, for instance, when goal two neural network 218 is trained during the training stage to classify image representations as being either attractive or non-attractive, during the production or inference stage, it can identify which of the unclassified images in the production data 401 are attractive.

The output of the network 218 can be an evaluation, estimation, prediction, and/or classification expressed using quantitative or numerical data type, qualitative data type, discreet data type, continuous data type (with lower and upper bounds), integers data type (with lower and upper bounds), binary data type (0 or 1), nominal data type, ordinal or ranked data type, categorical data type, interval data type, and/or ratio data type.

In one implementation, the trained goal two neural network 218 determines that a subset of the production data 401 is visually attractive. In another implementation, based on a threshold that applies to an attractiveness measure indicated in the output of the trained goal two neural network 218, a pool of best conforming data object image representations from the attractive subset is selected and stored by embedding the pool in an embedding space (e.g., offline candidate space 408). In some implementations, the embedding space is a metric or vector space where the image representations in the pool are stored along with corresponding data object images.

In implementations, outputs of the trained goal one neural network 216 are provided to the trained goal two neural network 218. Thus, in such an implementation, the best conforming image representations determined by the trained goal one neural network 216 are further evaluated by the trained goal two neural network 218 to identify most attractive image representations from among the best conforming image representations, and stored in the offline candidate space 408. In yet other implementations, outputs of the trained goal two neural network 218 are provided to the trained goal one neural network 216. Thus, in such an implementation, the most attractive image representations determined by the trained goal two neural network 218 are further evaluated by the trained goal one neural network 216 to identify best conforming image representations from among the most attractive image representations, and stored in the offline candidate space 408.

The rule-based percept filter 302 evaluates image features of the image representations in the production data 401 based on the perception metrics (discussed above) to identify attractive image representations. In one example, the rule-based percept filter 302 discards, from the production data 401, image representations that are not aesthetically attractive and/or do not cross an attractiveness threshold in dependence upon the perception metrics.

In one implementation, the rule-based percept filter 302 determines (e.g., does not discard) that a subset of the production data 401 is visually attractive. In another implementation, a pool of best conforming data object image representations from the attractive subset is selected and stored by embedding the pool in an embedding space (e.g., offline candidate space 408). In some implementations, the embedding space is a metric space or a vector space where the image representations in the pool are stored along with corresponding data object images.

The rule-based definitive filter 304 evaluates image features of the image representations in production data 401 based on the definitive metrics, the data object profiles, and the product brand persona (discussed above) to identify the image representations as conforming or non-conforming to a set of target identities or image representations of a data object, such as the product brand (e.g., Adidas™ shoes). In one example, the rule-based definitive filter 304 discards, from the production data 401, image representations which are not visually similar to the images of the product brand (e.g., Adidas™ shoes). In another example, the rule-based definitive filter 304 compares the image representations in the production data 401 to the persona representing the entire product brand and determines which image representations match with a data object profile of at least one model or type of the product brand. The rules utilized by the rule-based definitive filter 304 can be based on various dimensions, dimension values, attributes, components, parts, subcomponents, and/or subparts of the real-world entity, as they are represented in the image representations using image features and/or image vectors. For example, the rule-based definitive filter 304 identifies images having a "logo" of the product brand (e.g., Adidas™ logo) as conforming images. In other implementations, data object metadata, other than or in addition to a "logo" can be used.

In one implementation, the rule-based definitive filter 304 determines (e.g., does not discard) that a subset of the production data 401 visually conforms to the images of the product brand. In another implementation, a pool of best conforming data object image representations from the conforming subset is selected and stored by embedding the pool in an embedding space (e.g., offline candidate space 408). In some implementations, the embedding space is a metric space or a vector space where the image representations in the pool are stored along with corresponding data object images.

In one implementation, the production data 401 can be provided to the rule-based percept filter 302 and the image representations not discarded by the rule-based percept filter 302, or a subset of those, can be stored in the offline candidate space 408. Thus, in such an implementation, the attractive image representations are stored in the offline candidate space 408.

In another implementation, the production data 401 can be provided to the rule-based definitive filter 304 and the image representations not discarded by the rule-based definitive filter 304, or a subset of those, can be stored in the offline candidate space 408. Thus, in such an implementation, the conforming image representations are stored in the offline candidate space 408.

In implementations, outputs of the rule-based definitive filter 304 are provided to the rule-based percept filter 302. Thus, in such an implementation, the conforming image representations determined by the rule-based definitive filter 304 are further filtered by the rule-based percept filter 302 to identify attractive image representations from among the conforming image representations, and stored in the offline candidate space 408. In yet other implementations, outputs of the rule-based percept filter 302 are provided to the rule-based definitive filter 304. Thus, in such an implementation, the attractive image representations determined by the rule-based percept filter 302 are further filtered by the rule-based definitive filter 304 to identify conforming image representations from among the attractive image representations, and stored in the offline candidate space 408.

During operation, the production data 401 can be provided to either the rule-based percept filter 302, the rule-based definitive filter 304, the trained goal one neural network 216, and the trained goal two neural network 218, or any combination thereof. In some implementations, a processing pipeline, such as a module, a supermodule or a blueprint, can include processors that are members of the group comprising the rule-based percept filter 302, the rule-based definitive filter 304, the trained goal one neural network 216, and the trained goal two neural network 218. In the group (or processing pipeline), the members (processors) can be arranged in any order or sequence. Also, the group (or processing pipeline) can include different, fewer, or additional members (processors) than those illustrated in FIG. 4. Multiple members (processors) can be combined in some implementations. In such implementations, the image representations in the production data 401, and their alternative representations and characterizations, are processed through the group (or processing pipeline), with the final outputs from the last member (or last processor) of the group (or processing pipeline) being stored in the offline candidate space 408.

Regarding the offline candidate space 408, it is referred to herein as "offline" because it is not created, prepared, and/or populated in response to live online customizations or selections made to a data object by an end-user, and instead created independently and in advance. In contrast, the online candidate space 714, it is referred to herein as "online" because it is created, prepared, and/or populated in response to live online customizations or selections made to a data object by an end-user.

Embedding Space

In implementations, each of the offline candidate space 408 and the online candidate space 714 is an embedding space created by an embedding module. The "embedding space," into which the processed image representations are embedded by the embedding module, as used herein is a 2D or 3D or multidimensional geometric space within which image representations are represented. In one implementation, the embedding space is a vector space, in which the features of an image representation define its "position" in the vector space relative to an origin. In some implementations, the dimensionality of the image representations is reduced prior to the embedding (e.g., using principle component analysis (PCA) or convolutional neural networks (CNN)). The position is typically represented as a vector from the origin to the image representation's position, and the space has a number of dimensions based on the number of coordinates in the vector. Vector spaces deal with vectors and the operations that may be performed on those vectors. In another implementation, the embedding space is a metric space, which does not have a concept of position, dimensions, or an origin. Distances among image representations in a metric space are maintained relative to each other, rather than relative to any particular origin. Metric spaces deal with objects combined with a distance between those objects and the operations that may be performed on those objects. For purposes of the current discussion these objects are significant in that there exist many efficient algorithms that operate on vector spaces and metric spaces. For example metric trees may be used to rapidly identify objects that are "close" to each other. In implementations, image representations are embedded into vector spaces and/or metric spaces. In the context of a vector space, this means that a function is defined that maps image representations to vectors in some vector space. In the context of a metric space, this means that a metric (or distance) between image representations creates a metric space of the set of all such image representations. Note that vector spaces allow the use of a variety of standard measures of pairwise distance (e.g., pixel-by-pixel divergence), including the Euclidean distance, L1 distance, and L2 distance. Other implementations can use other types of embedding spaces.

To embed an image representation collection in a vector space, each image representation is associated with a vector. The distance between two image representations in such a space is then determined using standard measures of distance on vectors. The goal of embedding digital image representations in a vector space is to place visually similar image representations close to each other, where the distances between embedded image representations reflect similarity between the underlying data object images. There are many ways to achieve this. For example, vector space indexing techniques and/or image visualization techniques such as t-distributed stochastic neighbor embedding (t-SNE) can be used. In another example, images can be processed to identify commonly occurring features using, e.g., scale invariant feature transforms (SIFT), which are then binned. Of particular interest are embeddings created using deep neural networks, or other deep learning techniques. For instance, a neural network can learn an appropriate embedding by performing gradient descent against a measure of dimensionality reduction on a large set of training data. As another example, one could learn a kernel based on data and derive a distance based on that kernel. Likewise one may learn a distance directly. These approaches generally use large neural networks to map images to high dimensional vectors. Alternatively, one may learn an embedding using other algorithms such as multi-dimensional scaling or stochastic neighbor embedding. An embedding into a vector space may also be defined implicitly via a kernel. In this case, the explicit vectors may never be generated or used, rather the operations in the vectors space are carried out by performing kernel operations in the original space. For additional information regarding the embedding space, reference can be made to, for example, commonly owned U.S. patent application Ser. Nos. 14/494,364; 15/295,926; and 62/348,097, which are incorporated by reference for all purposes as if fully set forth herein.

Genetic Algorithm Based Offline Evolution of Candidate Space

Figure 5:
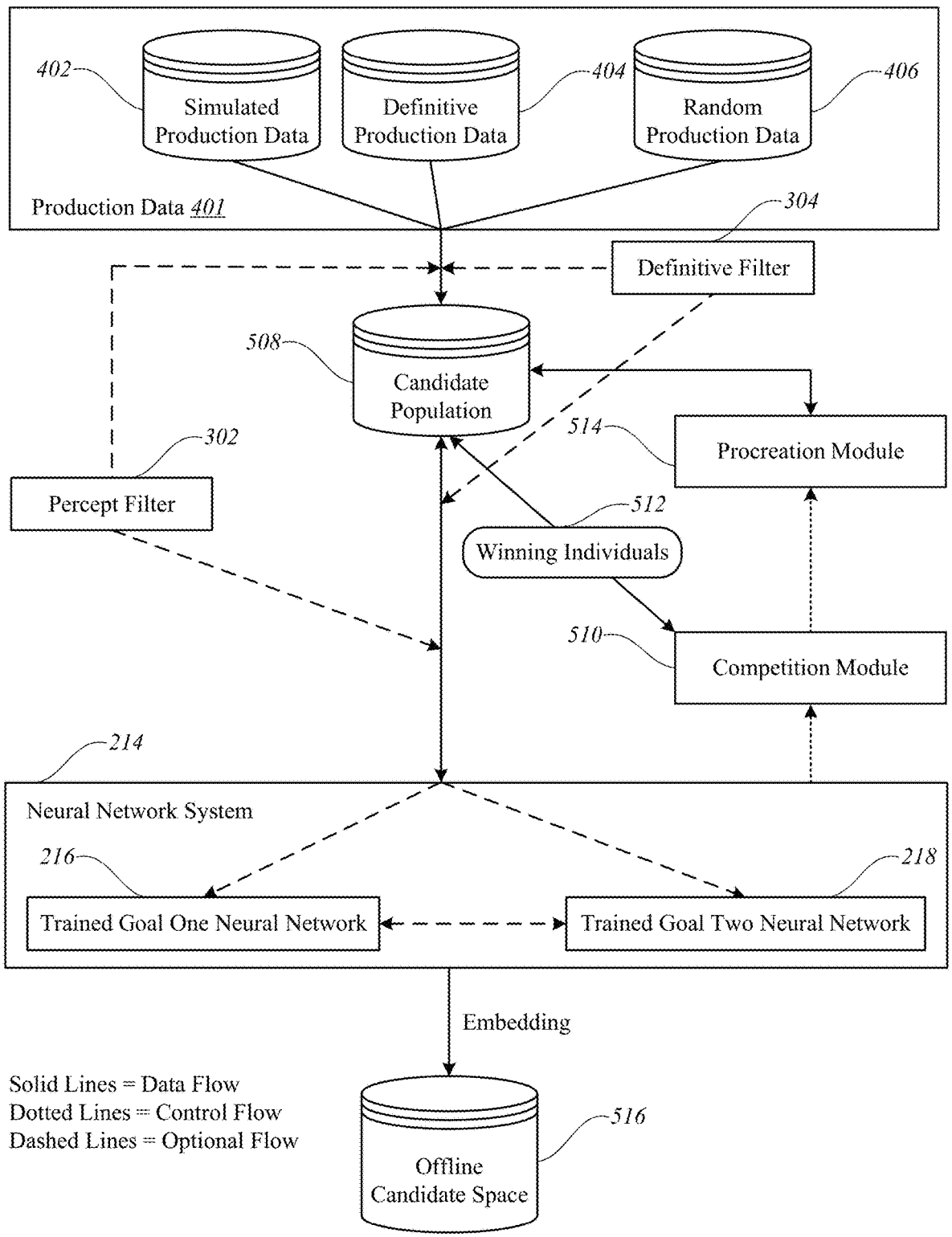
FIG. 5 shows modules that can be used for offline evolution of a candidate space using a genetic algorithm implemented by a training system that includes a trained neural network system and/or a rule-based percept filter and/or a rule-based definitive filter.

FIG. 5 shows modules that can be used for offline evolution of a candidate space 516 using a genetic algorithm implemented by the training system 104 that includes a trained neural network system 214 and/or a rule-based percept filter 302 and/or a rule-based definitive filter 304. In FIG. 5, solid lines indicate data flow, broken lines indicate control flow, and dotted lines indicate optional modules. The modules in FIG. 5 can be implemented in hardware or software, and need not be divided up in precisely the same blocks as shown in FIG. 5. Some can also be implemented on different processors or computers, or spread among a number of different processors or computers. In addition, it will be appreciated that some of the modules can be combined, operated in parallel or in a different sequence than that shown in FIG. 5 without affecting the functions achieved.

Also as used herein, the term "module" can include "sub-modules," which themselves can be considered herein to constitute modules. Roughly described, members (or processors) of the group (or processing pipeline) comprising the rule-based percept filter 302, the rule-based definitive filter 304, the trained goal one neural network 216, and the trained goal two neural network 218 are also considered herein to be sub-modules of a candidate testing module (not shown for simplicity's sake). The candidate testing module, a competition module 510, and a procreation module 514 are also considered herein to be sub-modules of a candidate processing module (not shown for simplicity's sake). The blocks in FIG. 5 designated as modules can also be thought of as flowchart steps in a method.

In implementations, a systematically or randomly created offline candidate space (such as offline candidate space 408) can form an initial version of the candidate population 508, and can be subjected to genetic algorithm-based evolution, as described below. So, in some implementations, an initial version of the candidate population 508 just includes the production data 401, as shown in FIG. 5. In other implementations, an initial version of the candidate population 508 includes the offline candidate space 408 comprising optimized or filtered production data 401 or portions thereof.

The training system 104 interacts with a database 508 containing a candidate individual population of individuals representing data object image representations in the production data 401. The candidate individual population database 508 includes a portion containing an elitist pool (not shown for simplicity's sake). The training system 104 operates according to the fitness measures determined by the candidate testing module, which indicate to the training system 104 how to measure the fitness of an individual. The training system 104 optimizes for individuals that have the greatest fitness or any fitness at all, however fitness is defined by the fitness measures. The fitness measures are specific to the environment and goals of the particular application. For example, the fitness measures of individuals in the candidate population 508 are determined in dependence upon conformity of the corresponding data object image representations with respective predefined goals (discussed above), as determined by either of the rule-based percept filter 302, the rule-based definitive filter 304, the trained goal one neural network 216, and the trained goal two neural network 218, or any combination thereof.

In yet other implementations, a fitness measure is based on "novelty" of an individual relative of other individuals in the population database 508. In one implementation, the novelty is determined by comparing an individual's dimensions and dimension values against the same of other individuals in the population database 508. In some implementations, individuals with a high novelty score, i.e., more unique dimensions and dimension values, can be rewarded and preferred during evolution of various generations. In some implementations, evaluation of a given individual can be based on a combination of a conformity fitness measure, an attractiveness fitness measure, and a novelty fitness measure.

As discussed above, the candidate testing module (not shown for simplicity's sake) includes members (or processors) of the group (or processing pipeline) comprising the rule-based percept filter 302, the rule-based definitive filter 304, the trained goal one neural network 216, and the trained goal two neural network 218. The candidate testing module tests the individuals in the population 508. In some implementations, testing includes developing fitness measures for the individuals by processing the individuals using one or more members (or processors) of the candidate testing module. For example, in one implementation, the individuals are processed using the trained goal one neural network 216 and assigned a conformity measure based on their degree of conformity to a set of target identities or image representations of a data object, such as the product brand (e.g., Adidas™ shoes), as discussed above. In this case, the fitness measure of the individuals is the conformity measure of the corresponding data object image representations. In another example implementation, the individuals are processed using the trained goal two neural network 218 and assigned an attractiveness measure based on the perception metrics (discussed above). In this case, the fitness measure of the individuals is the attractiveness measure of the corresponding data object image representations. In some implementations, the fitness measure of the individuals is a combination of their conformity measure and their attractive measure as respectively determined by the trained goal one neural network 216 and the trained goal two neural network 218 of the neural network system 214. In other implementations, a novelty fitness measure can be determined for the individuals based on the number of unique or different dimensions and dimension values.

In other implementations, the fitness measure of the individuals is a categorical determination made by the rule-based percept filter 302 and/or the rule-based definitive filter 304, such that the individuals which are discarded are categorized as "unfit" and the individuals which are not discarded are categorized as "fit". In yet other implementations, the rule-based percept filter 302 and/or the rule-based definitive filter 304 are used in conjunction with the neural network system 214 such that they filter the data object image representations in the production data 401 (to enforce conformity with different predefined goals discussed above), which is provided to the neural network system 214 for evaluation. This way, the candidate population 508 includes "high quality" or "superior" individuals, which already conform to the predefined goals to a certain degree before they are evaluated by the neural network system 214.

In one implementation, the individuals in candidate individual population 508 are stored and managed by conventional database management systems (DBMS), and are accessed using SQL statements. Thus, a conventional SQL query can be used to obtain, for example, the fitness measures of the individuals. New individuals can be inserted into the population 508 using the SQL "insert" statement, and individuals being discarded can be deleted using the SQL "delete" statement. In another implementation, the individuals in the population 508 are stored in a linked list. In such an implementation insertion of a new individual can be accomplished by writing its contents into an element in a free list, and then linking the element into the main linked list. Discarding of individuals involves unlinking them from the main linked list and re-linking them into the free list.

Next, the competition module 510 updates the population 508 contents in dependence upon the updated fitness measures. The operation of the competition module 510 is described in more detail below, but briefly, the module discards individuals that do not meet the minimum baseline individual fitness or whose "individual fitness" relatively lags the "individual fitness" of similarly tested individuals. Population 508 is updated with the revised contents. In other implementations, all remaining individuals form the elitist pool. In yet other implementations, the elitist pool is a subset of the remaining individuals. In one implementation, individuals with higher novelty scores are preferred for graduation to the elitist pool.

After the population 508 has been updated, the procreation module 514 evolves a random subset of them. Only individuals in the elitist pool are permitted to procreate. Any conventional or future-developed technique can be used for procreation. In an implementation, conditions, outputs, or rules from parent individuals are combined in various ways to form child individuals, and then, occasionally, they are mutated. The combination process for example may include cross-over—i.e., exchanging conditions, outputs, or entire rules between parent individuals to form child individuals. New individuals created through procreation begin with performance metrics that are indicated as undefined. Preferably, after new individuals are created by combination and/or mutation, the parent individuals are retained. In this case the parent individuals also retain their fitness measures, and remain in the elitist pool. In another implementation, the parent individuals are discarded.

After procreation, the candidate testing module operates again on the updated population 508. The process continues repeatedly. In some implementations, a control module (not shown for simplicity's sake) iterates the candidate testing module, the competition module 510, and the procreation module 514 until after the competition module 510 yields a candidate pool of individuals not yet discarded but which satisfy a convergence condition. The convergence condition can be defined as an optimal output of the fitness measures, according to some definition. The convergence condition may be, for example, a recognition that the candidate pool is no longer improving after each iteration.

As mentioned, the competition module 510 manages the graduation of winning individuals 512 from the population 508 to the elitist pool. This process can be thought of as occurring one individual at a time, as follows. First, a loop is begun through all individuals from whom the fitness measures have been updated since the last time the competition module 510 was executed. If the fitness measures for a current individual are still below a baseline individual fitness or sufficiently lags relative individual fitness of other individuals, then the individual is discarded and the next one is considered. If the fitness measures for the current individual are above a baseline individual fitness or relatively on par with individual fitness of other individuals, then the individual is added to the elitist pool. The process then moves on to consider the next individual in sequence. In one implementation, a novelty fitness measure is used to determine graduation of individuals to the elitist pool. In such a case, individuals that have the most unique and/or different dimensions and dimension values in a given generation of winning individuals are given more weight for graduation purposes.

The following pseudo code shows one implementation of the evolutionary algorithm:

```
set_evolution_parameters
create_candidates_generation_1
repeat
   repeat
       test_candidates
   until candidate_spread_is_sufficient or remove_criteria_is_met
   remove_low_performing_candidates
   create_new_candidates
until performance_is_sufficient or no_more_designs_are_possible
```

Sometime after the elitist pool is full or meets a specified capacity threshold, individuals are embedded in the offline candidate space 516, as discussed above with respect to the embedding space.

Data Object Creation and Recommendation Using Offline Evolved Candidate Space

Figure 6:
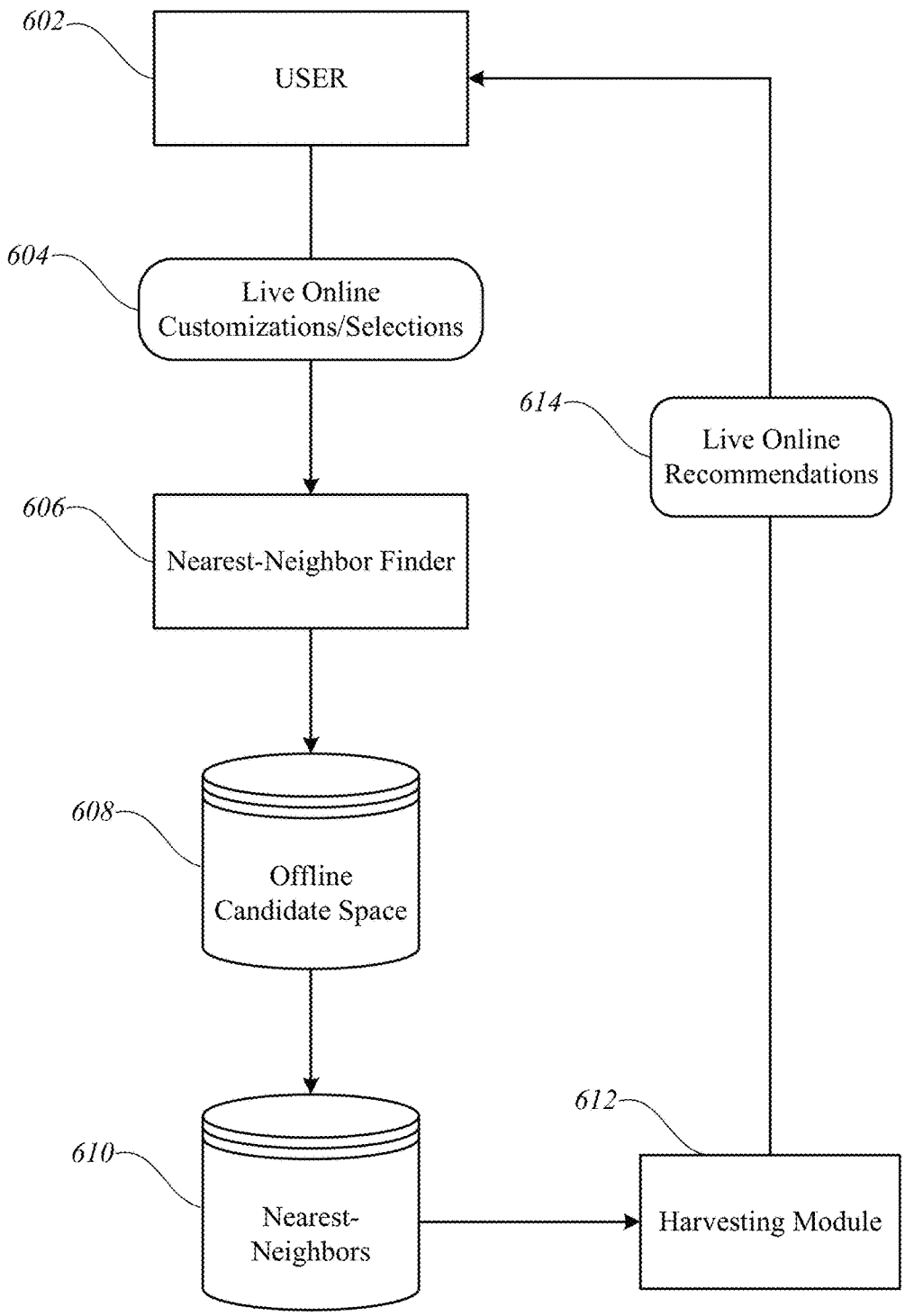
FIG. 6 is one implementation of generating real-time data objects and web recommendations in dependence upon user-generated web customizations and an offline evolved candidate space.

FIG. 6 is one implementation of generating real-time data objects and web recommendations in dependence upon user-generated web customizations and an offline evolved candidate space. The user 602 receives in real-time images of data objects via a browser running on a client (e.g., mobile, tablet, computer). For example, the user 602 can receive data object images while interacting with a product website like the one shown in FIGS. 8A-8D in real-time. The data object presented to the user 602 has various dimensions, as discussed above. For example, an Adidas™ shoe data object shown in FIGS. 8A-8D has dimensions such as a stripes dimension, a vamp dimension, and others. The user 602 can select in real-time the data object as it is presented to the user 602 or make real-time customizations to it by adding new dimensions (e.g., adding a toe overlay dimension to the Adidas™ shoe data object), removing pre-existing dimensions (e.g., removing a heel overlay dimension to the Adidas™ shoe data object), and/or modifying dimension values of pre-existing dimensions (e.g., changing a color and/or a texture of the stripe dimension and/or the vamp dimension of the Adidas™ shoe data object). The data object customizations or selections made by the user 602 in real-time are referred to herein as "live online customizations or selections" 604.

Thus, the technology disclosed treats the live online customizations or selections 604 made by the user as a "starting point" and generates further recommendations by identifying individuals and corresponding data objects that are proximate to the starting point in terms of visual conformity and attractiveness, in some implementations, and different from the starting point in terms of novelty, in other implementations. In yet other implementations, a single recommendation is generated by selecting an individual and corresponding data object that is most visually conforming, most attractive, and also most novel and/or slightly novel.

The live online selections or customizations 604 made by the user 602 are then provided to a nearest-neighbor finder 606. The nearest-neighbor finder 606 applies various nearest-neighbor retrieval techniques to an offline candidate space 608 (e.g., offline candidate space 408, offline candidate space 516), and identifies a set of data object image representations that are most visually similar to the live online selections or customizations 604. The most visually similar data object image representations are stored as nearest-neighbors 610. The nearest-neighbors 610 are then provided to the user 602 as live online recommendations 614 via a harvesting module 612. The loop iterates as the user 602 further selects or makes further customizations to the live online recommendations 614.

Figure 8A:
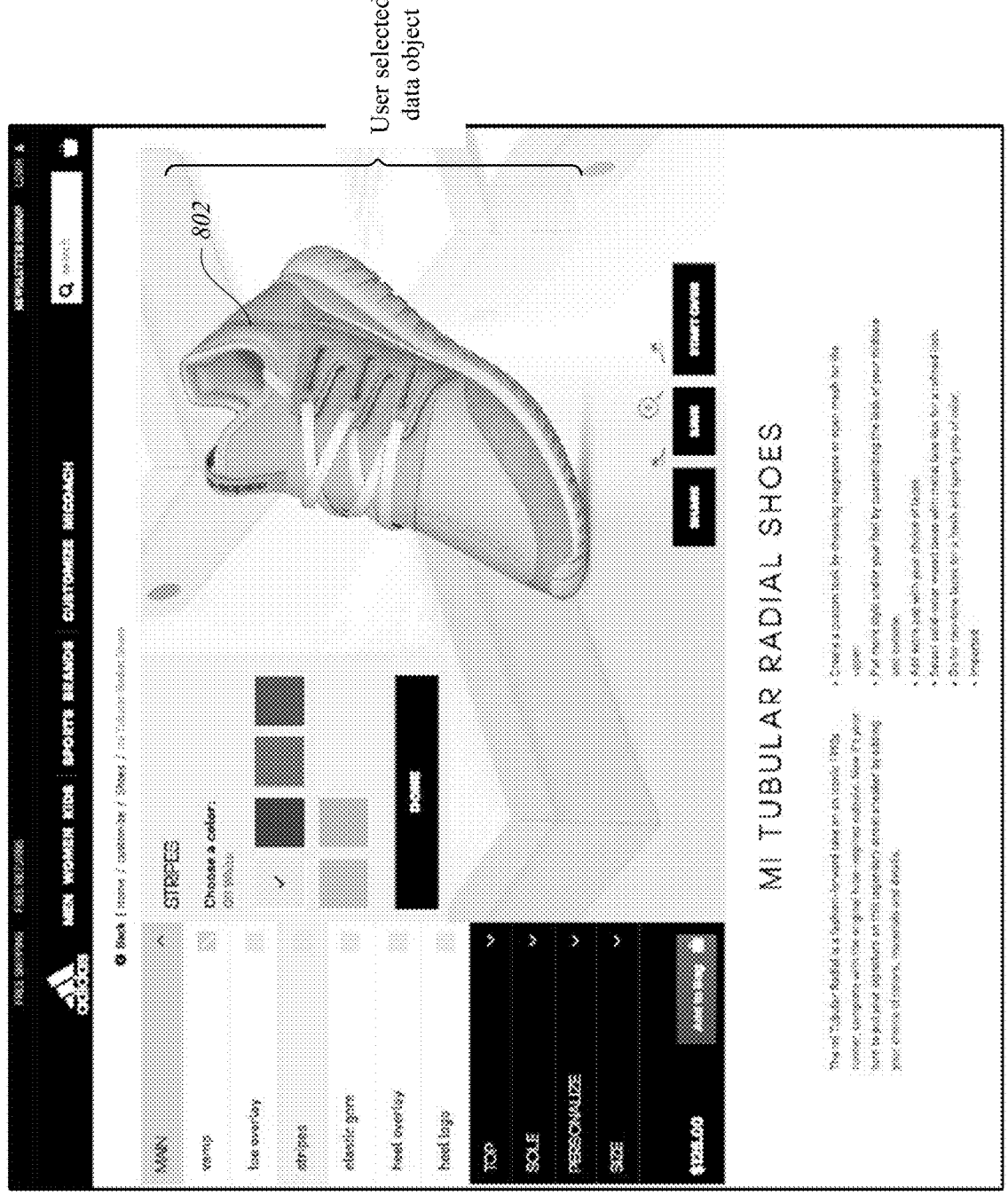
FIGS. 8A-8G depict example results of generating real-time data objects and web recommendations in accordance with one implementation of the technology disclosed.
Figure 8B:
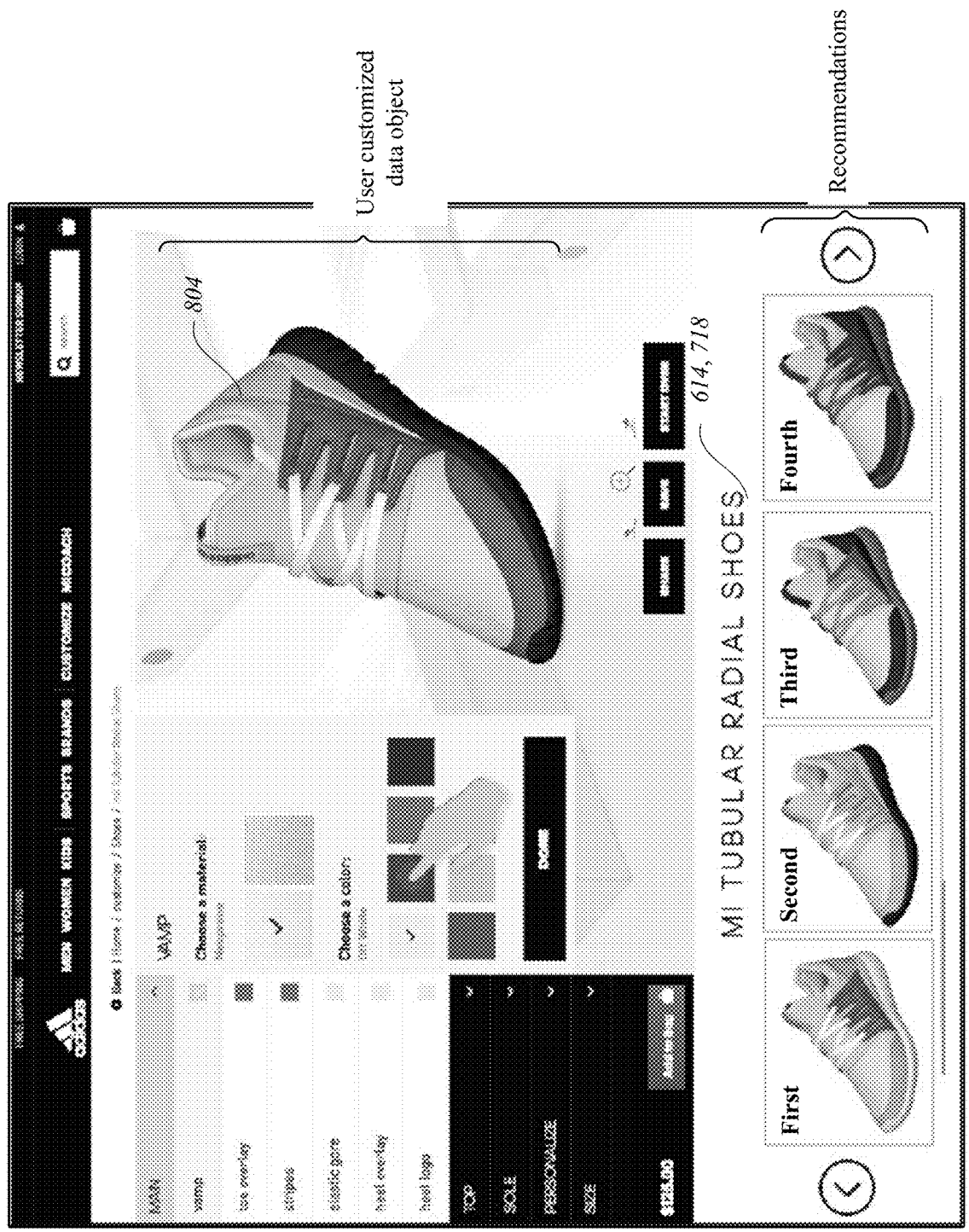
Figure 8C:
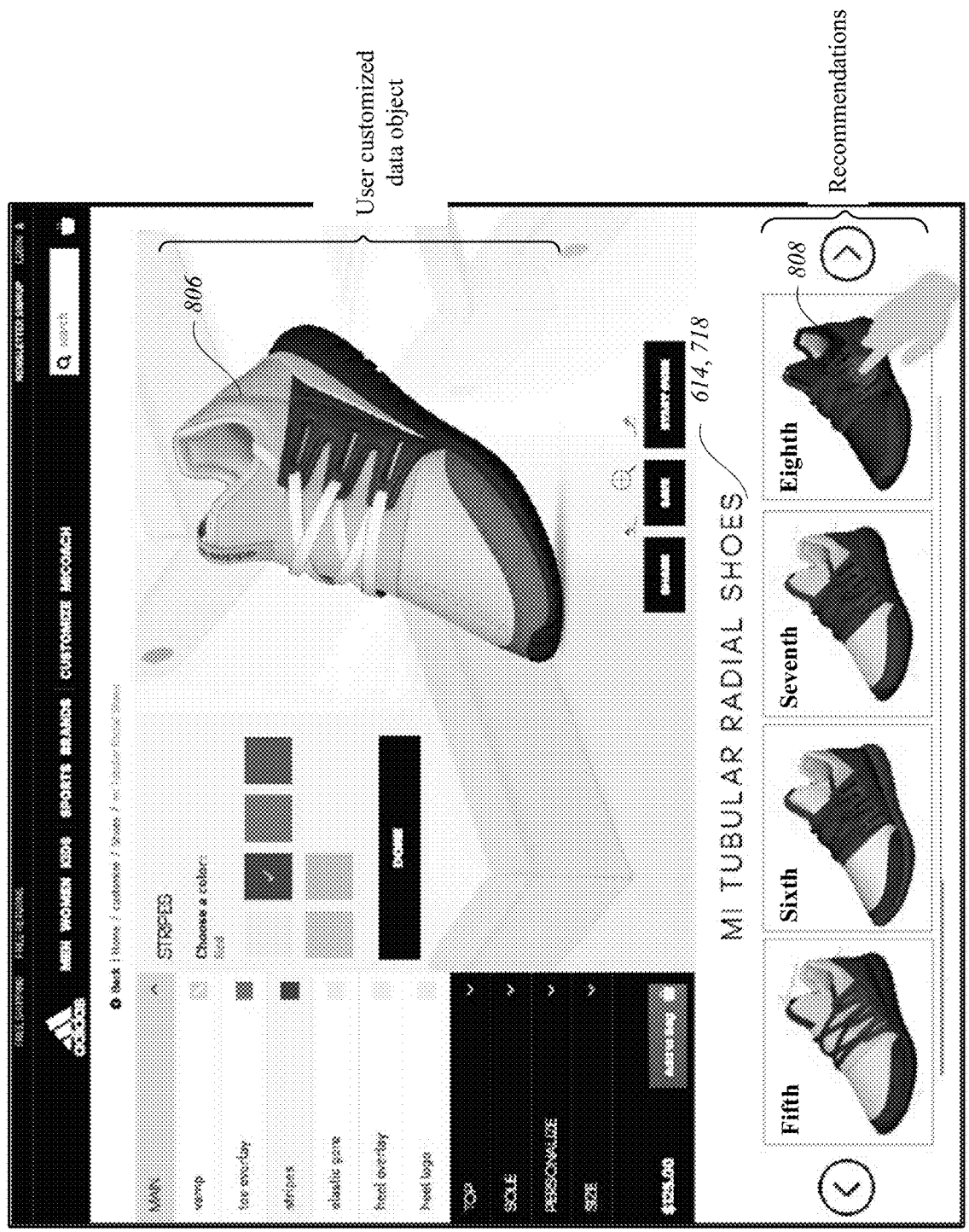
Figure 8D:
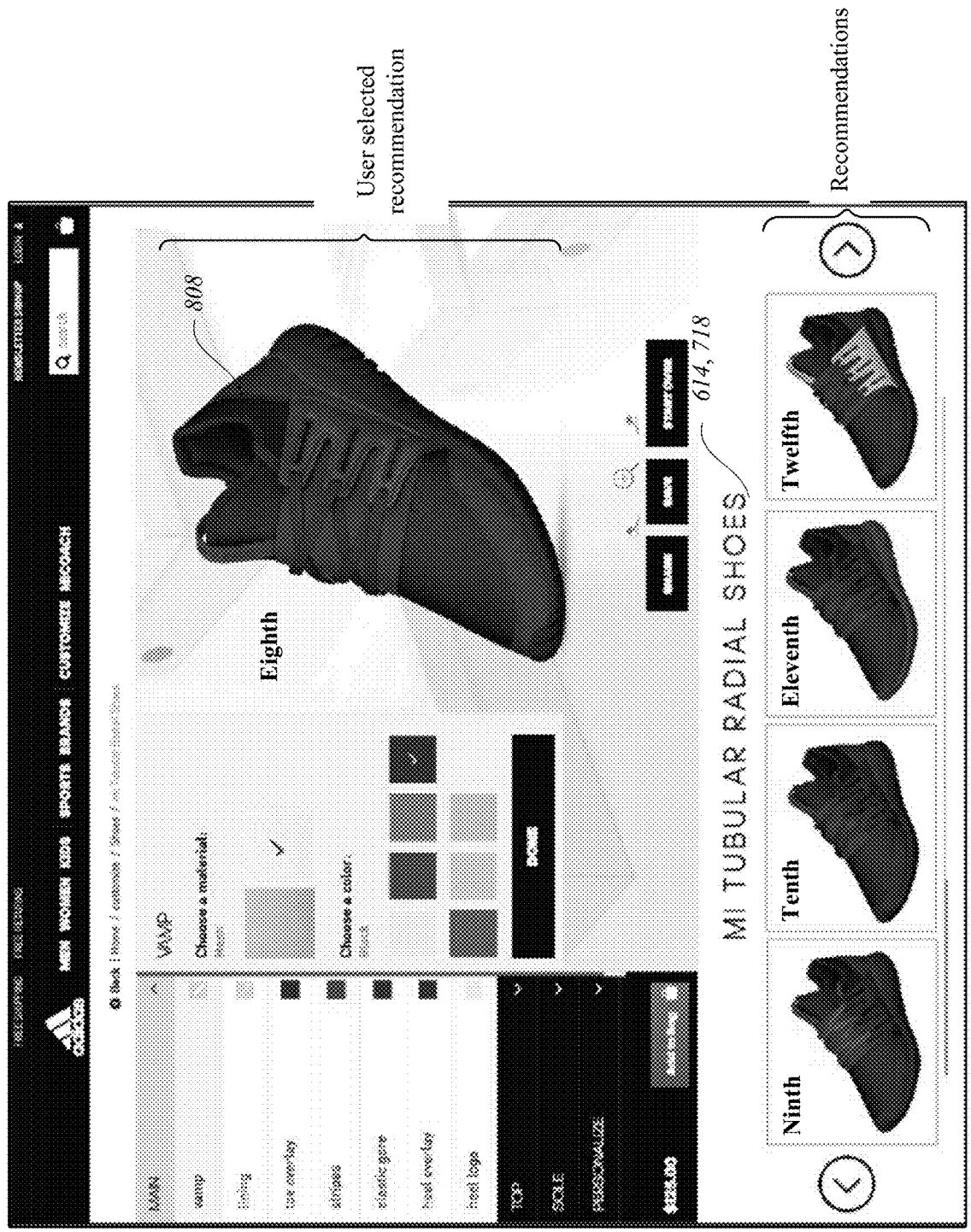

In the example shown in FIGS. 8B-8D, the live online customization 604 made by the user 602 includes the user 602 modifying a color of the vamp dimension of a starting point shoe data object 804. The nearest-neighbors 610 or live online recommendations 614 generated by the nearest-neighbor finder 606 include a set of first, second, third, and fourth shoe data objects that are visually similar to the starting point shoe data object 804 with respect to various dimensions and dimension values, such as the vamp dimension color customized by the user 602 and the top dimension color. However, the first, second, third, and fourth shoe data objects are also visually different from the starting point shoe data object 804 with respect to other dimensions and dimension values, such as sole dimension color.

Regarding the novelty parameter, in some implementations, the technology disclosed identifies data objects for recommendation that are visually similar to a starting point data object (e.g., shoe data object 804) and also attractive, however, among the recommended data objects (e.g., first, second, third, and fourth shoe data objects), each of the recommended shoe data objects are different from each other. This is achieved by selecting each of the recommended data object based on their novelty score, i.e., number of unique and/or different dimensions and dimension values relative to dimensions and dimension values of other candidate data objects identified for recommendation. Thus, for example, in FIG. 8B, the first recommended shoe object is visually different from the second, third, fourth recommended shoe objects in terms of some dimension and dimension values (e.g., different stripes color, tongue logo color), yet also similar to the second, third, fourth recommended shoe objects in terms of some dimension and dimension values (e.g., same vamp color). In implementations, the similarities or differences between the recommended data objects are randomly assigned or created such that a first pair of recommended data objects can have a first set of similar and/or different dimensions and dimension values, and a second pair of recommended data objects can have a second set of similar and/or different dimensions and dimension values. Certain pairs of recommended data objects can share the sets of similar and/or different dimensions and dimension values.

Similarly, in FIG. 8B, for example, the first recommended shoe object is visually different from a starting point data object (e.g., shoe data object 802, 804, 806, 808, 810, 812, 814) in terms of some dimension and dimension values (e.g., different toe overlay color and texture), yet also similar to the starting point data object in terms of some dimension and dimension values (e.g., lace color and texture). In implementations, the similarities or differences between the recommended data objects and a starting point data object are randomly assigned or created such that a first set of recommended data objects and the starting point data object can have a first set of similar and/or different dimensions and dimension values, and a second set of recommended data objects and the starting point data object can have a second set of similar and/or different dimensions and dimension values. Certain recommended shoe objects, with respect to the starting point object, can share the sets of similar and/or different dimensions and dimension value among each other.

Furthermore, as shown in FIG. 8C, when the user 602 further selects or further customizes a particular nearest-neighbor 610 or live online recommendation 614 generated by the nearest-neighbor finder 606, the loop continues and the further selected or further customized data object is then treated as the most recent, current, or new live online customization or selection. The most recent, current, or new live online customization or selection is then similarly processed by the nearest-neighbor finder 606 to generate the corresponding nearest-neighbors 610 or the corresponding live online recommendations 614. In the example shown in FIGS. 8C-8D, the user 602 selects, in FIG. 8C, the eighth shoe object with black body and red stripes. Accordingly, in FIG. 8D, the eighth shoe object with black body and red stripes is treated as the user-selected or user-customized data object (i.e., the starting point live online customization or selection 604), and further nearest-neighbors or visually similar data objects (e.g., ninth, tenth, eleventh, twelfth shoe objects) are presented to the user as further live online recommendations 614.

In implementations, the harvesting module 612 deploys renders or one recommended data object at a time or a group of a recommended data objects based on a conformity parameter, an attractiveness parameter, and a novelty parameter, or any combination thereof. It would be apparent to one skilled in the art that the frontend presentation of the recommended data objects based on the identified corresponding winning individual(s) can be done in any combination, order, or sequence using any graphical presentation or animation scheme.

Genetic Algorithm Based Online Evolution of Candidate Space

Figure 7:
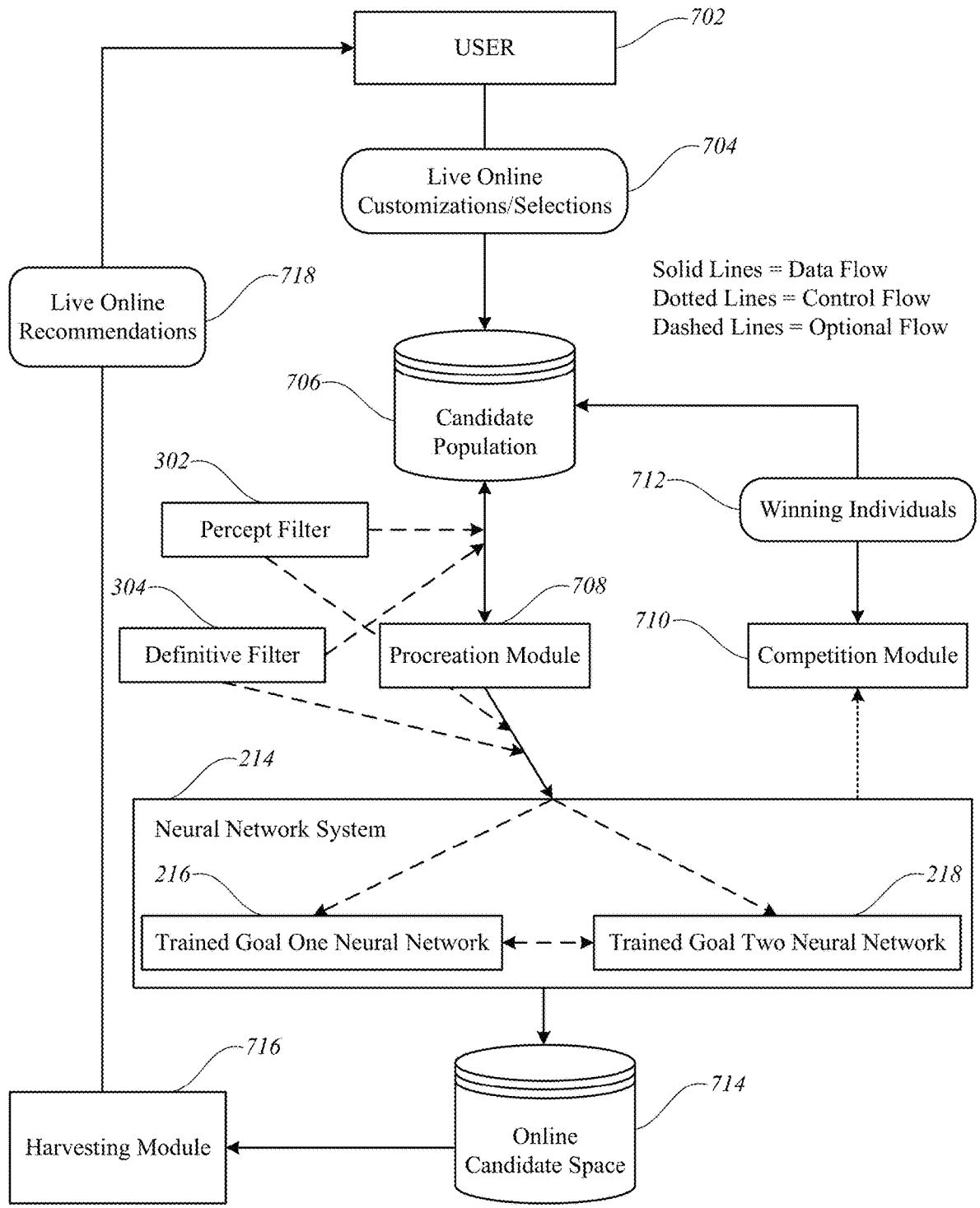
FIG. 7 illustrates one implementation of generating real-time data objects and web recommendations in dependence upon an online evolved candidate space.

FIG. 7 illustrates one implementation of generating real-time data objects and web recommendations in dependence upon an online evolved candidate space. The online candidate space is created and evolved "on the fly" an in real-time in response to the live online customizations or selections 704 made by the user 702. The user 702 receives, in real-time, images of data objects via a browser running on a client (e.g., mobile, tablet, computer). For example, the user 702 can receive data object images while interacting with a product website like the one shown in FIGS. 8A-8D in real-time. The data object presented to the user 702 has various dimensions, as discussed above. For example, an Adidas™ shoe data object shown in FIGS. 8A-8D has dimensions such as a stripes dimension, a vamp dimension, and others. The user 702 can select in real-time the data object as it is presented to the user 702 or make real-time customizations to it by adding new dimensions (e.g., adding a toe overlay dimension to the Adidas™ shoe data object), removing pre-existing dimensions (e.g., removing a heel overlay dimension to the Adidas™ shoe data object), and/or modifying dimension values of pre-existing dimensions (e.g., changing a color and/or a texture of the stripe dimension and/or the vamp dimension of the Adidas™ shoe data object). The data object customizations or selections made by the user 702 in real-time are referred to herein as "live online customizations or selections" 704.

The live online selections or customizations 704 made by the user 702 are then stored in the candidate population 706 as individuals. Procreation module 708 then creates new individuals based on the live online selections or customizations 704 using mutation, according to one implementation. In such an implementation, if the individual representing the user-customized data object representation has, for example, twenty dimensions, and the user 702 customized just four dimensions, then only the non-customized sixteen dimensions are randomly mutated to procreate new individuals. Thus, in this way, the resulting individuals preserve the customizations made by the user 702, while identifying individuals with different dimension values. Accordingly, the user preferences are preserved and alternative designs, constrained by or in the context of the user provided customizations are generated. In other implementations, the procreation module 708 can apply cross-over to the resulting individuals and the individual representing the user-customized data object representation to generate even more individuals. The procreate modules 708 then updates the candidate population 706 with the procreated individuals.

The candidate testing module (not shown for simplicity's sake) including members (or processors) of the group (or processing pipeline) comprising the rule-based percept filter 302, the rule-based definitive filter 304, the trained goal one neural network 216, and the trained goal two neural network 218 then develops fitness measures for the individuals in the population 706 in dependence upon a variety of predefined goals, as discussed above.

Competition module 710 then discards certain individuals from the population 706 to identify/populate the elitist pool with winning individuals 712, as discussed above. In some implementations, individuals with higher novelty score, i.e., more unique and/or different dimension values and dimensions are rewarded and not discarded. The procreation module 708 then procreates new individuals using the individuals in the elitist pool, as discussed above. After procreation, the candidate testing module operates again on the updated population 706. The process continues repeatedly. In some implementations, a control module (not shown for simplicity's sake) iterates the candidate testing module, the competition module 710, and the procreation module 708 until after the competition module 710 yields a candidate pool of individuals not yet discarded but which satisfy a convergence condition. The convergence condition can be defined as an optimal output of the fitness measures, according to some definition. The convergence condition may be, for example, a recognition that the candidate pool is no longer improving after each iteration. Sometime after the elitist pool is full or meets a specified capacity threshold, individuals are embedded in the online candidate space 714, as discussed above with respect to the embedding space.

In some implementations, individuals are selected for embedding in the online candidate space 714 after one cycle or pass through the procreation module 708, the candidate testing module, and the competition module 710. In other implementations, individuals are selected for embedding in the online candidate space 714 after multiple cycles or passes through the procreation module 708, the candidate testing module, and the competition module 710. The data object recommendations corresponding to the most superior individuals in the elitist pool and embedded in the online candidate space 714 (e.g., most conforming to the live online customizations or selections 704, most attractive, and/or most novel) are then provided to the user 702 as live online recommendations 718 via a harvesting module 716. The loop iterates as the user 702 further selects or makes further customizations to the live online recommendations 718.

Note that, in response to the live online customizations or selections 704, the evolution loop or loops in FIG. 7 are executed within sub-seconds to create/populate the online candidate space 714 on the fly, with the live online recommendations 718, comprising a plurality of most conforming and most attractive data objects, being provided to the user 702 in real-time.

In yet other implementations, the online candidate space 714 is created systematically, without necessarily using a genetic algorithm. For example, the online candidate space 714 is created in dependence upon at least one starter data object and its starter dimensions and starter dimension values. In one implementation, the starter data object and its starter dimensions and starter dimension values are created, designed, or selected by a user or a designer. In another implementation, the online candidate space 714 is created by randomly choosing an available value for a set of dimensions. In yet another implementation, the online candidate space 714 is created in a maximally uniform manner across the distribution of an available set of dimension values in dependence upon a predetermined number of candidate individuals to be created.

Thus, the technology disclosed treats the live online customizations or selections 7 made by the user as a "starting point" and generates further recommendations by identifying individuals and corresponding data objects that are proximate to the starting point in terms of visual conformity and attractiveness, in some implementations, and different from the starting point in terms of novelty, in other implementations. In yet other implementations, a single recommendation is generated by selecting an individual and corresponding data object that is most visually conforming, most attractive, and also most novel and/or slightly novel.

Thus, in some implementations, data object recommendations are made by identifying a group of individuals that are: most visually similar to the data object identified by the live online customizations or selections 704, i.e., the starting point data object; most attractive; and have the highest novelty score among the pool of winning individuals identified in that particular generation of the evolution.

Regarding the novelty parameter, in some implementations, the technology disclosed identifies data objects for recommendation that are visually similar to a starting point data object (e.g., shoe data object 804) and also attractive, however, among the recommended data objects (e.g., first, second, third, and fourth shoe data objects), each of the recommended shoe data objects are different from each other. This is achieved by selecting each of the recommended data object based on their novelty score, i.e., number of unique and/or different dimensions and dimension values relative to dimensions and dimension values of other candidate data objects identified for recommendation. Thus, for example, in FIG. 8B, the first recommended shoe object is visually different from the second, third, fourth recommended shoe objects in terms of some dimension and dimension values (e.g., different stripes color, tongue logo color), yet also similar to the second, third, fourth recommended shoe objects in terms of some dimension and dimension values (e.g., same vamp color). In implementations, the similarities or differences between the recommended data objects are randomly assigned or created such that a first pair of recommended data objects can have a first set of similar and/or different dimensions and dimension values, and a second pair of recommended data objects can have a second set of similar and/or different dimensions and dimension values. Certain pairs of recommended data objects can share the sets of similar and/or different dimensions and dimension values.

Similarly, in FIG. 8B, for example, the first recommended shoe object is visually different from a starting point data object (e.g., shoe data object 802, 804, 806, 808, 810, 812, 814) in terms of some dimension and dimension values (e.g., different toe overlay color and texture), yet also similar to the starting point data object in terms of some dimension and dimension values (e.g., lace color and texture). In implementations, the similarities or differences between the recommended data objects and a starting point data object are randomly assigned or created such that a first set of recommended data objects and the starting point data object can have a first set of similar and/or different dimensions and dimension values, and a second set of recommended data objects and the starting point data object can have a second set of similar and/or different dimensions and dimension values. Certain recommended shoe objects, with respect to the starting point object, can share the sets of similar and/or different dimensions and dimension value among each other.

In implementations, the harvesting module 716 deploys renders or one recommended data object at a time or a group of a recommended data objects based on a conformity parameter, an attractiveness parameter, and a novelty parameter, or any combination thereof. It would be apparent to one skilled in the art that the frontend presentation of the recommended data objects based on the identified corresponding winning individual(s) can be done in any combination, order, or sequence using any graphical presentation or animation scheme.

Data Object Creation and Recommendation Using Online Evolved Candidate Space

In FIG. 8A, the user creates/selects a standard shoe data object 802. In FIG. 8B, the user modifies the standard shoe data object 802 (e.g., by selecting or modifying a color of a vamp dimension). What results is a modified shoe data object 804 (e.g., equivalent to the live online customizations/selections 604, 704) with some dimensions and dimension values from the standard shoe data object 802 and some new dimensions and dimension values specified by the user. Using the modified shoe data object 804 as the starting point, the procreation module 708 procreates a set of first, second, third, and fourth shoe data objects that are visually similar to the modified shoe data object 804 with respect to various dimensions and dimension values, such as the vamp dimension color customized by the user and the top dimension color by preserving those dimensions and dimension values of an individual corresponding to the modified shoe data object 804, while mutating other dimension values of the individual. As a result, the first, second, third, and fourth shoe data objects are also visually different from the modified shoe data object 804 with respect to other dimensions and dimension values, such as sole dimension color. The first, second, third, and fourth shoe data objects are presented, on the fly and in real-time, to the user as first, second, third, and fourth recommendations in FIG. 8B.

Continuing to FIG. 8C, the user further modifies the modified shoe data object 802, for example, by changing the stripes color from "off white" to "red" to create a further modified shoe data object 806. Accordingly, using the further modified shoe data object 806 as the starting point, the fifth, sixth, seventh, and eighth shoe data objects are presented, on the fly and in real-time, to the user as fifth, sixth, seventh, and eighth recommendations in FIG. 8C.

Continuing to FIG. 8D, here, instead of further modifying the further modified shoe data object 804, the user simply selected one of the recommendations 808 presented to the user in FIG. 8C. In the example shown in FIG. 8D, the user has selected the eighth recommendation, i.e., the eighth shoe data object 808. Accordingly, using the eighth shoe data object as the starting point, the ninth, tenth, eleventh, and twelfth shoe data objects are presented, on the fly and in real-time, to the user ninth, tenth, eleventh, and twelfth recommendations in FIG. 8D.

Figure 8E:
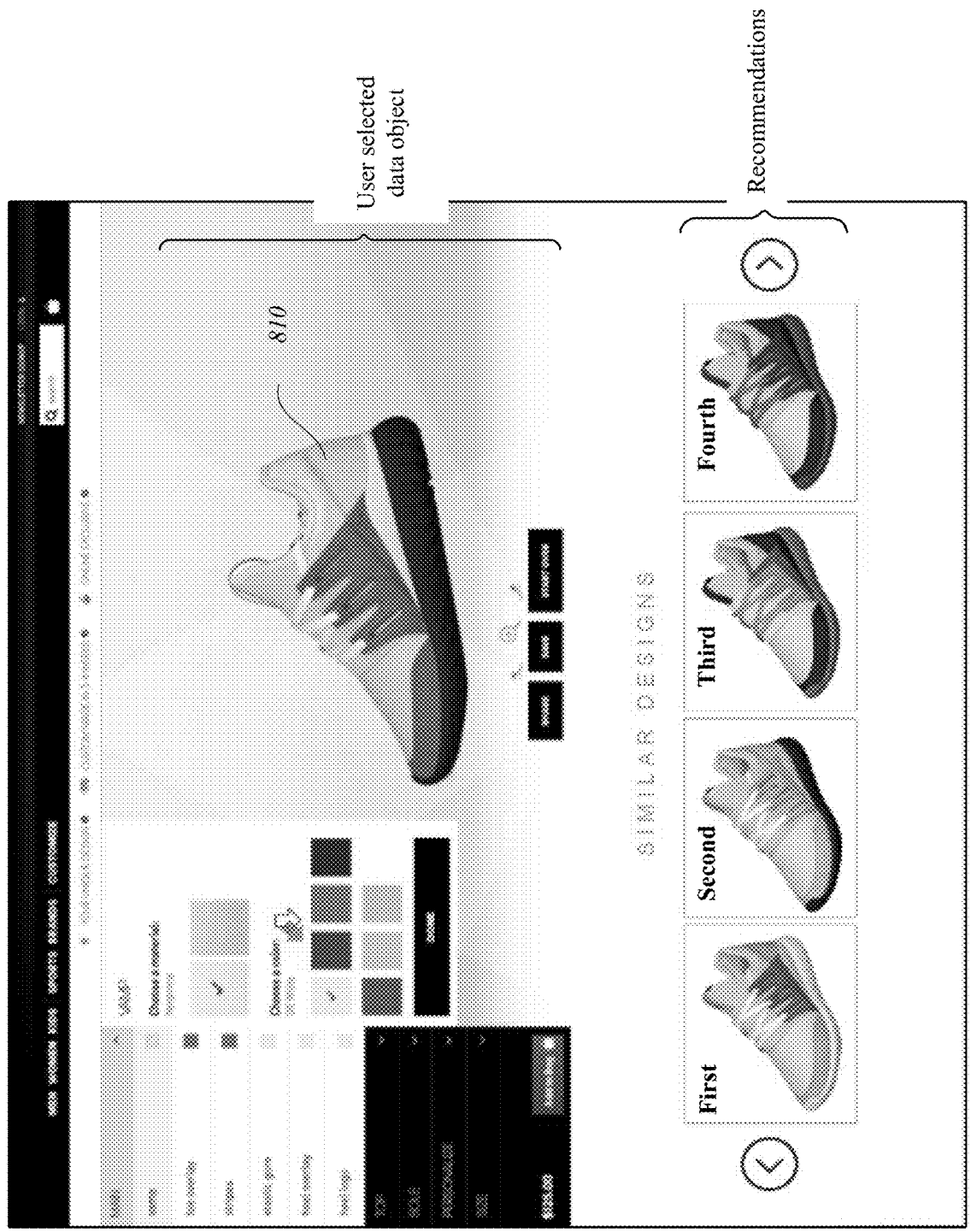
Figure 8F:
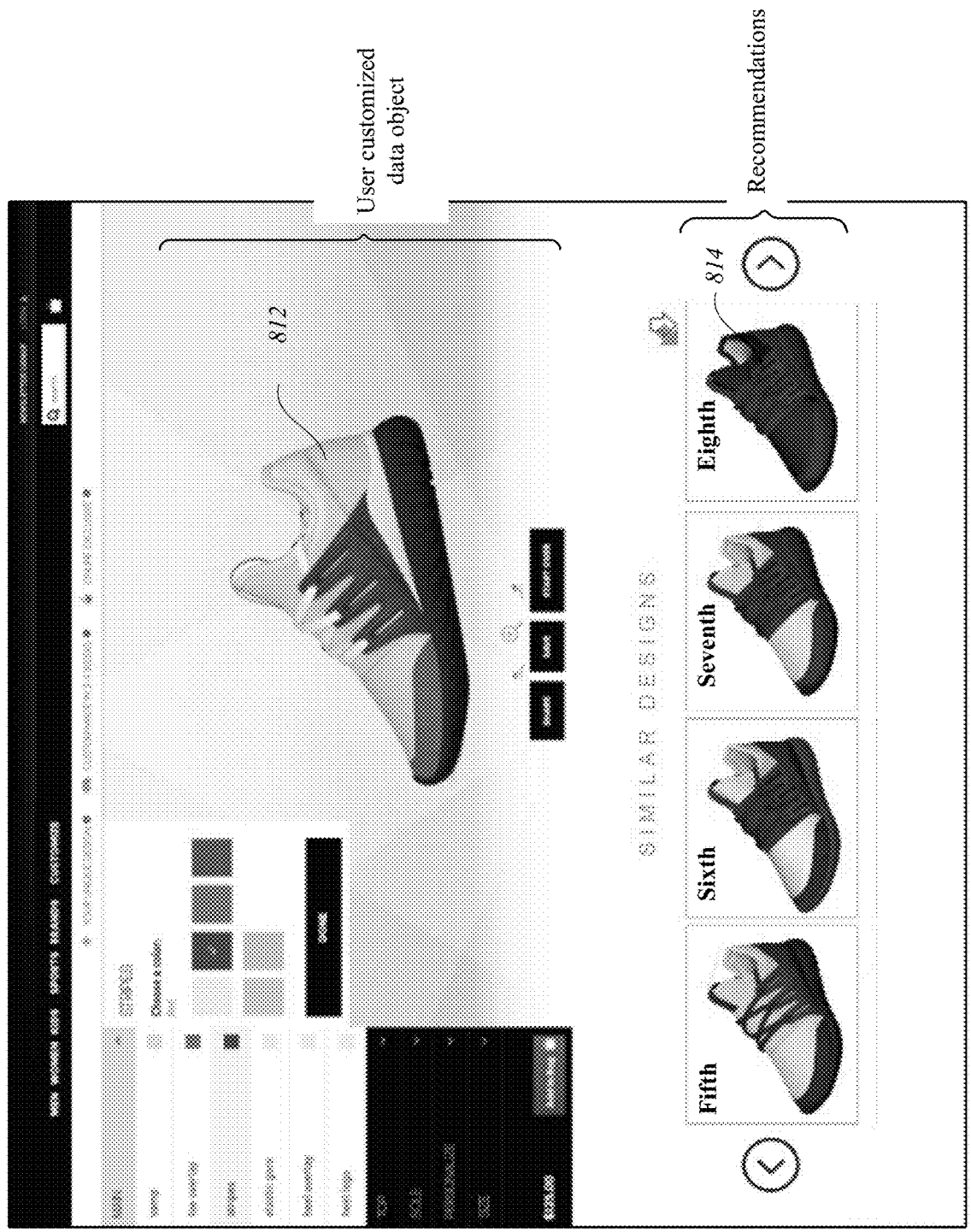
Figure 8G:
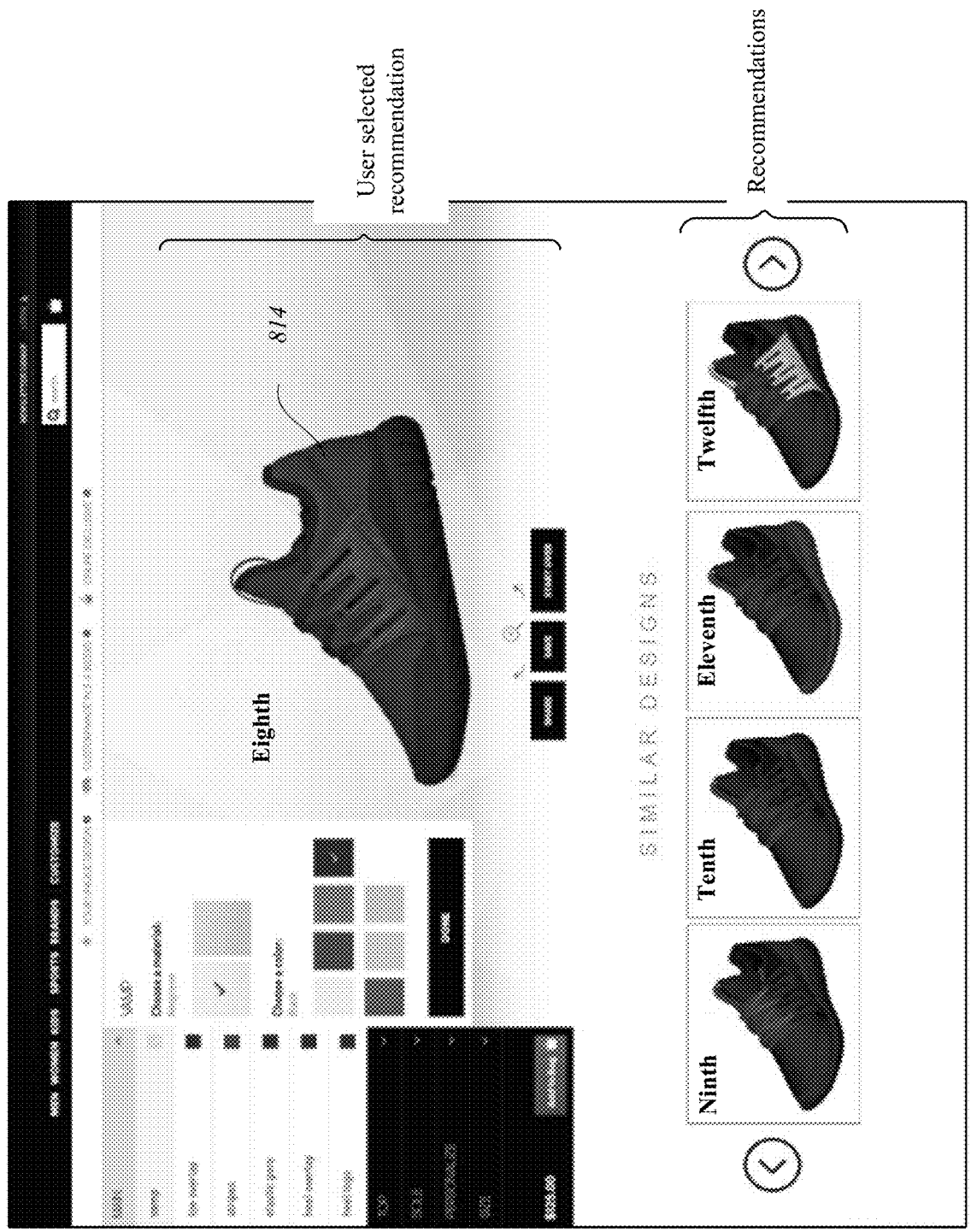

Similarly, in FIGS. 8E-8G, the user selected or customized shoe data objects 810, 812, and 814 (e.g., either manually customized by the user and/or selected by the user from a set of recommended data objects) are treated as starting points and followed up on the fly and in real-time with recommendations to the user in the form of first to twelfth shoe data objects. As discussed above, these recommendations are based on the conformity parameter (constrained by user made customizations, in some implementations); the attractiveness parameter; and the novelty parameter; or any combination thereof as applied to the user selected or customized shoe data objects 810, 812, and 814.

Accordingly, the loop continues and the further selected or further customized data objects are continuously treated as the most recent, current, or new live online customizations or selections, i.e., the starting points. The most recent, current, or new live online customizations or selections are then similarly processed by the procreation module 708, the candidate testing module, and the competition module 710 to generate the corresponding real-time embeddings for the online candidate space 714 or the corresponding live online recommendations 718.

Processes

Figure 9:
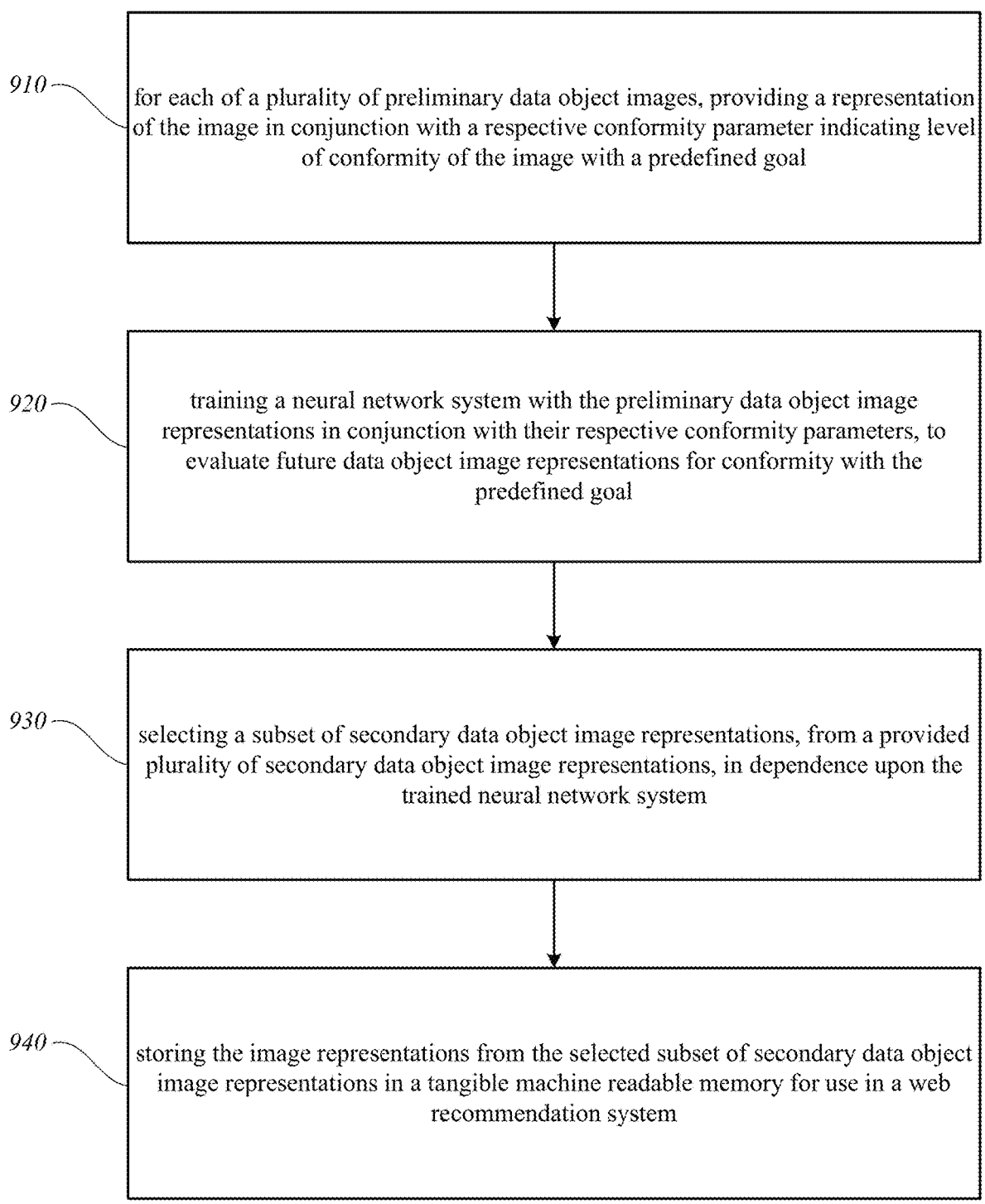
FIG. 9 is a flowchart showing a neural network-based method of preparing a data object creation and recommendation database in accordance with one implementation of the technology disclosed.

FIG. 9 is a flowchart showing a neural network-based method of preparing a data object creation and recommendation database in accordance with one implementation of the technology disclosed. Flowchart in FIG. 9 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 9. Multiple actions can be combined in some implementations. For convenience, this flowchart is described with reference to the system that carries out a method. The system is not necessarily part of the method.

At action 910, the method includes for each of a plurality of preliminary data object images, providing a representation of the image in conjunction with a respective conformity parameter indicating level of conformity of the image with a predefined goal.

At action 920, the method includes training a neural network system with the preliminary data object image representations in conjunction with their respective conformity parameters, to evaluate future data object image representations for conformity with the predefined goal.

At action 930, the method includes selecting a subset of secondary data object image representations, from a provided plurality of secondary data object image representations, in dependence upon the trained neural network system.

At action 940, the method includes storing the image representations from the selected subset of secondary data object image representations in a tangible machine readable memory for use in a data object creation and recommendation system.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as training system, training, definitive metrics, perception metrics, percept filter, definitive filter, neural network system, and others.

In one implementation, the data object images are simulated images comprising simulated training data.

In one implementation, the data object images are conforming and/or non-conforming real-world images comprising definitive training data.

In one implementation, the representation of the image is a feature vector.

In one implementation, the representation of the image is a red-green-blue (RGB) image.

In one implementation, the representation of the image is a depth map.

In one implementation, the representation of the image is a color image.

In one implementation, the predefined goal is visual similarity of image features of the image representations with image features of a set of target image representations.

In one implementation, the predefined goal is visual conformance of image features of the image representations with a set of perception metrics.

In one implementation, the respective conformity parameter indicating level of conformity of the image with the predefined goal is manually set in dependence upon crowd-sourced intelligence.

In one implementation, the neural network system further includes a plurality of neural networks trained to achieve conformity with different predefined goals in dependence upon respective thresholds.

In one implementation, the method includes selecting a subset of best conforming image representations from a set of conforming image representations identified in dependence upon the trained neural network system.

In one implementation, the plurality of secondary data object image representations are generated randomly using simulated images.

In one implementation, the plurality of secondary data object image representations are generated randomly using real-world images.

In one implementation, the method includes applying a rule-based percept filter to the preliminary data object image representations for training the neural network system, wherein the percept filter enforces visual conformance of image features of the image representations with a set of perception metrics.

In one implementation, applying a rule-based definitive filter to the preliminary data object image representations for training the neural network system, wherein the definitive filter enforces visual conformance of image features of the image representations with a set of definitive metrics.

In one implementation, the method includes selecting the subset of secondary data object image representations in dependence upon a rule-based percept filter, wherein the percept filter enforces visual conformance of image features of the image representations with a set of perception metrics.

In one implementation, the method includes selecting the secondary data object image representations in dependence upon a genetic algorithm by instantiating a candidate population of candidate secondary data object image representations, evaluating each of the candidates in the candidate population using the trained neural network system and developing a conformance metric for each of the candidates undergoing the evaluation, selecting candidates undergoing the evaluation for discarding from the candidate population in dependence upon the developed conformance metric, adding to the candidate population new candidates procreated in dependence upon a set of at least one parent candidate from the candidate population not yet selected for discarding, and iterating the evaluation, the discarding, and the adding until after a pool of candidates not yet discarded but which satisfy a convergence condition is identified.

In one implementation, the method includes storing the image representations from the selected subset of secondary data object image representations by embedding the image representations in an embedding space.

In one implementation, the embedding space is a vector space.

In one implementation, the embedding space is a metric space.

In one implementation, the method includes storing, in the embedding space, the images representations along with corresponding data object images.

In one implementation, the method includes iteratively receiving data object images of a product customized by a user, each data object image having a plurality of dimensions with at least some dimensions of the data object image modified by the user and generating nearest-neighbor recommendations, at each iteration, for frontend display to the user in dependence upon the subset of secondary data object image representations identified in an embedding space.

Other implementations of the method described in this section can include a computer readable storage medium storing instructions in a non-transitory manner, which are executable by a processor to perform any of the methods described above. Yet another implementation of the method described in this section can include a system including memory and one or more processors operable to execute instructions, stored in the memory, to perform any of the methods described above.

Figure 10:
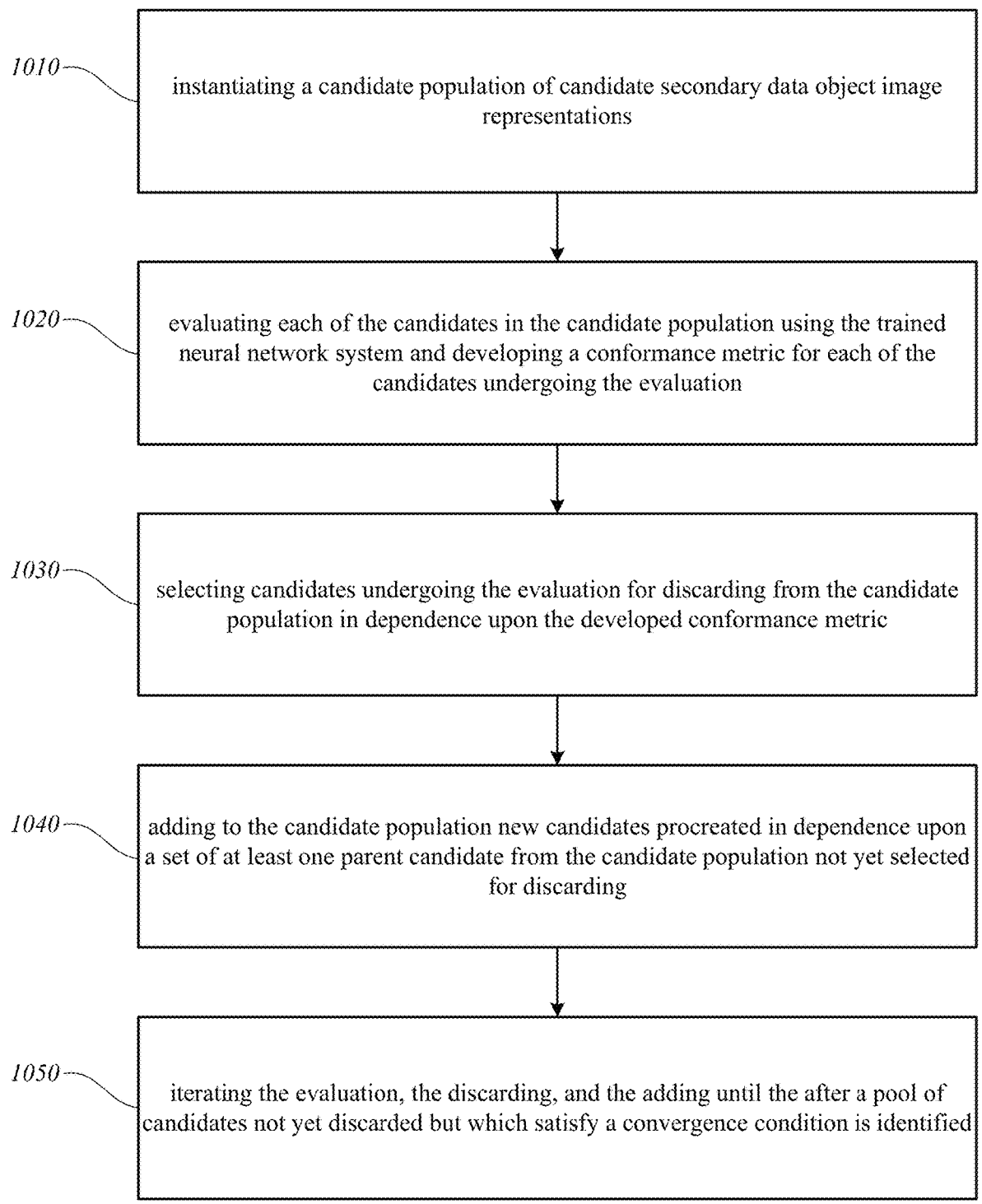
FIG. 10 depicts a representative method of offline evolution of a candidate space using a genetic algorithm, a trained neural network system, and/or a rule-based percept filter, and/or a rule-based definitive filter.

FIG. 10 depicts a representative method of offline evolution of a candidate space using a genetic algorithm, a trained neural network system, and/or a rule-based percept filter, and/or a rule-based definitive filter. Flowchart in FIG. 10 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 10. Multiple actions can be combined in some implementations. For convenience, this flowchart is described with reference to the system that carries out a method. The system is not necessarily part of the method.

At action 1010, the method includes instantiating a candidate population of candidate secondary data object image representations.

At action 1020, the method includes evaluating each of the candidates in the candidate population using the trained neural network system and developing a conformance metric for each of the candidates undergoing the evaluation. In implementations, the conformance metric is conformity with target identities or image representations of a data object, such as the product brand (e.g., Adidas™ shoes), attractiveness, novelty, and others.

At action 1030, the method includes selecting candidates undergoing the evaluation for discarding from the candidate population in dependence upon the developed conformance metric.

At action 1040, the method includes adding to the candidate population new candidates procreated in dependence upon a set of at least one parent candidate from the candidate population not yet selected for discarding.

At action 1050, the method includes iterating the evaluation, the discarding, and the adding until after a pool of candidates not yet discarded but which satisfy a convergence condition is identified.

Other implementations of the method described in this section can include a computer readable storage medium storing instructions in a non-transitory manner, which are executable by a processor to perform any of the methods described above. Yet another implementation of the method described in this section can include a system including memory and one or more processors operable to execute instructions, stored in the memory, to perform any of the methods described above.

Figure 11:
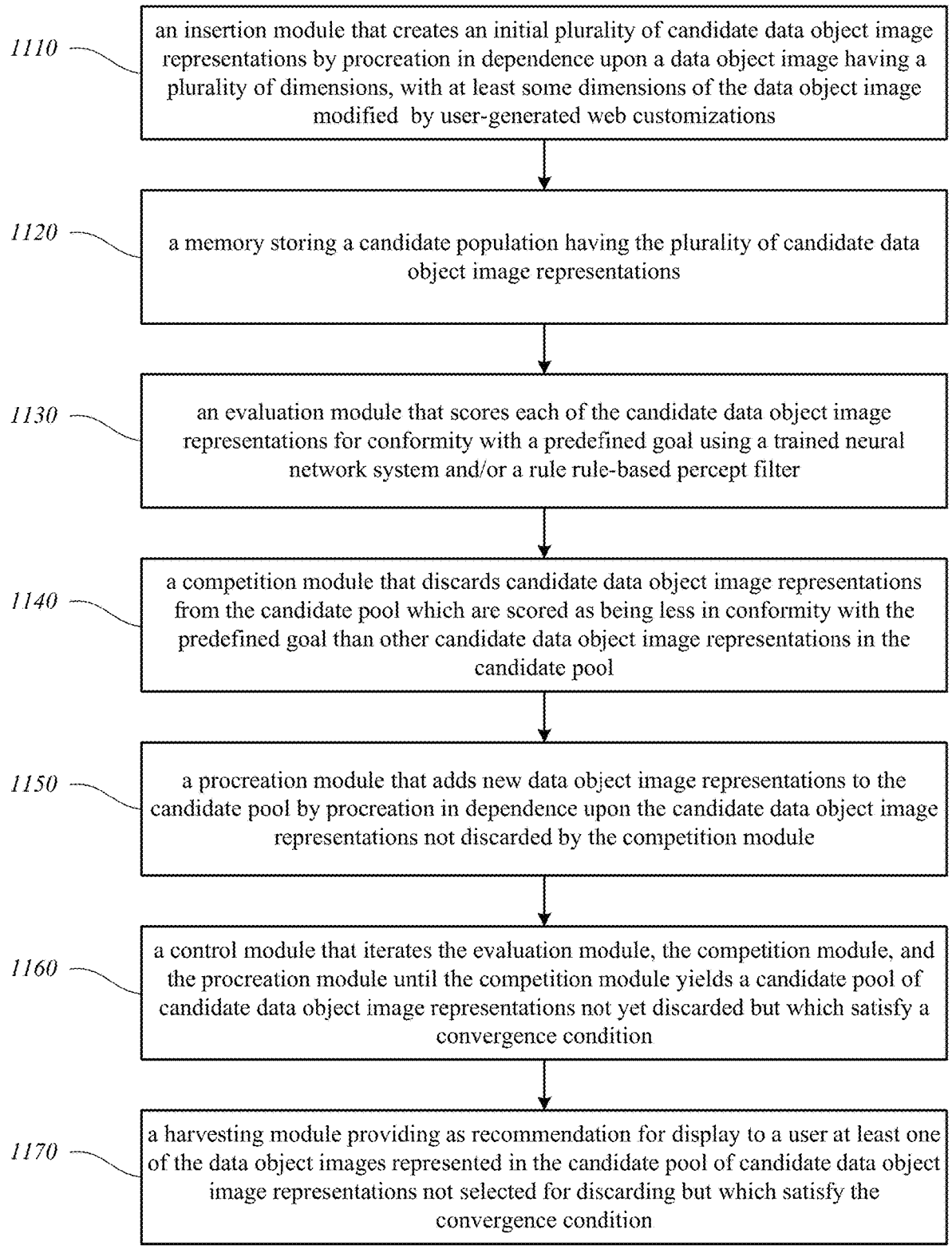
FIG. 11 is an operational flow diagram illustrating a high-level overview of providing expanded data object correlations for user-generated web customizations in accordance with one implementation of the technology disclosed.

FIG. 11 is an operational flow diagram illustrating a high-level overview of providing expanded data object correlations for user-generated web customizations in accordance with one implementation of the technology disclosed. Flowchart in FIG. 11 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 11. Multiple actions can be combined in some implementations. For convenience, this flowchart is described with reference to the system that carries out a method. The system is not necessarily part of the method.

At action 1110, the method includes creating an initial plurality of candidate data object image representations by procreation in dependence upon a data object image having a plurality of dimensions, with at least some dimensions of the data object image modified by user-generated web customizations. In yet other implementations, the initial plurality of candidate data object image representations are created systematically, without necessarily using a genetic algorithm. For example, the initial plurality of candidate data object image representations are created in dependence upon at least one starter data object and its starter dimensions and starter dimension values. In one implementation, the starter data object and its starter dimensions and starter dimension values are created, designed, or selected by a user or a designer. In another implementation, the initial plurality of candidate data object image representations are created by randomly choosing an available value for a set of dimensions. In yet another implementation, the initial plurality of candidate data object image representations are created in a maximally uniform manner across the distribution of an available set of dimension values in dependence upon a predetermined number of candidate individuals to be created.

At action 1120, the method includes storing a candidate population having the plurality of candidate data object image representations.

At action 1130, the method includes scoring each of the candidate data object image representations for conformity with a predefined goal using a trained neural network system and/or a rule rule-based percept filter.

At action 1140, the method includes discarding candidate data object image representations from the candidate pool which are scored as being less in conformity with the predefined goal than other candidate data object image representations in the candidate pool. In one implementation, individuals with higher novelty scores are rewarded and not discarded.

At action 1150, the method includes adding new data object image representations to the candidate pool by procreation in dependence upon the candidate data object image representations not discarded by the competition module.

At action 1160, the method includes iterating the evaluation module, the competition module, and the procreation module until the competition module yields a candidate pool of candidate data object image representations not yet discarded but which satisfy a convergence condition.

At action 1170, the method includes providing as recommendation for display to a user at least one of the data object images represented in the candidate pool of candidate data object image representations not selected for discarding but which satisfy the convergence condition.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as training system, training, definitive metrics, perception metrics, percept filter, definitive filter, neural network system, and others.

In one implementation, the method includes procreating the data object image having the plurality of dimensions further includes mutating one or more dimension values of the dimensions.

In one implementation, the method includes crossing-over two or more parent candidate data object image representations not discarded by the competition module.

In one implementation, the method includes crossing-over two or more parent candidate data object image representations not discarded by the competition module and mutating a resulting child data object image representation procreated by the crossing-over.

In one implementation, the method includes a plurality of neural networks trained to achieve conformity with different predefined goals in dependence upon respective thresholds.

In one implementation, the data object image is selected from a recommended collection of data object images that was presented toward to the user.

In one implementation, the user-generated web customizations are manual modifications of one or more image features of a prior data object image.

In one implementation, the prior data object image is one previously recommended toward the user.

In one implementation, the prior data object image is one previously customized and/or selected by the user.

In one implementation, the predefined goal is visual similarity of image features of the image representations with image features of a set of target image representations.

In one implementation, the predefined goal is visual conformance of image features of the image representations with a set of perception metrics.

In one implementation, the rule-based percept filter enforces visual conformance of image features of the image representations with a set of perception metrics.

Other implementations of the method described in this section can include a computer readable storage medium storing instructions in a non-transitory manner, which are executable by a processor to perform any of the methods described above. Yet another implementation of the method described in this section can include a system including memory and one or more processors operable to execute instructions, stored in the memory, to perform any of the methods described above.

Figure 12:
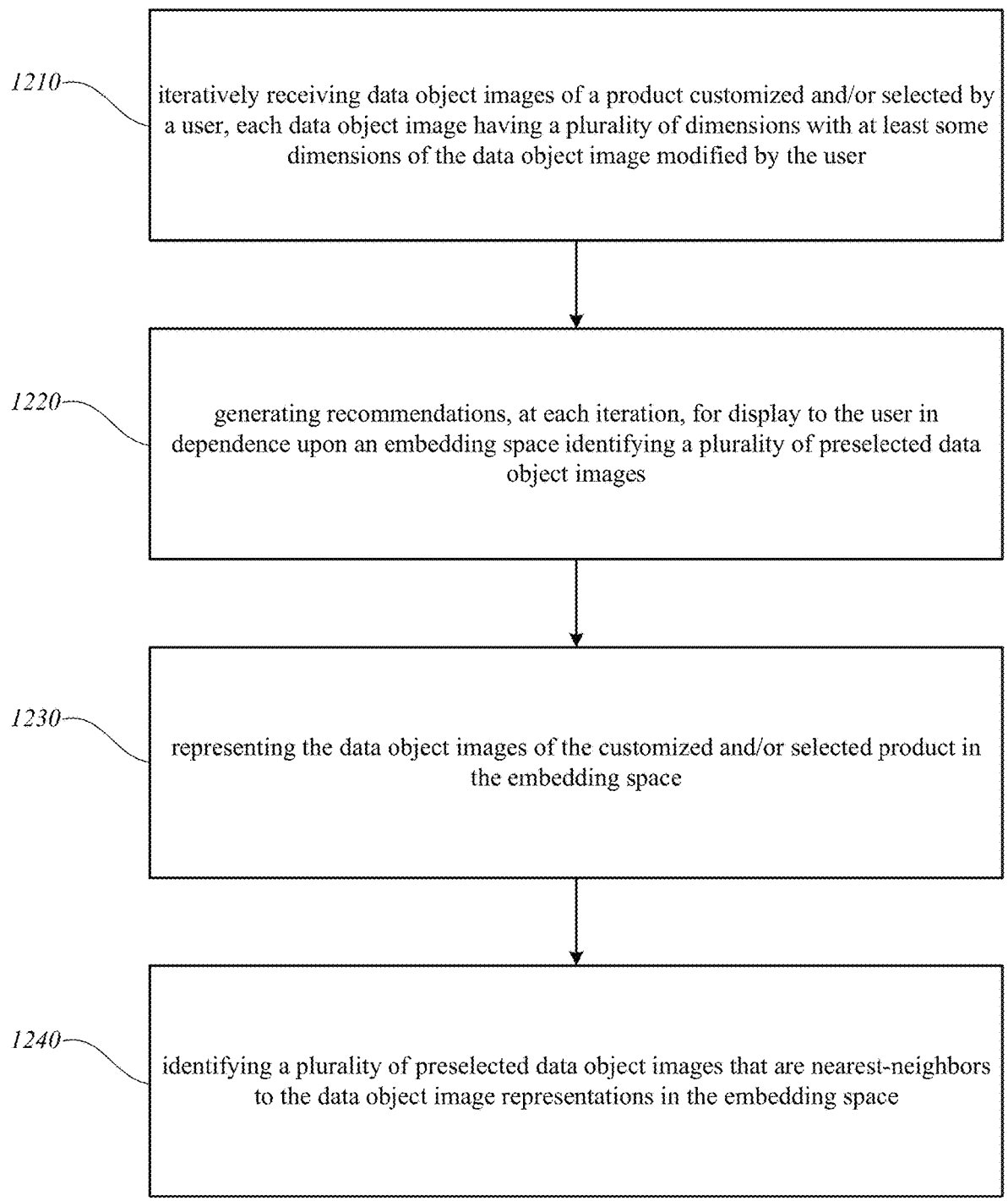
FIG. 12 illustrates a flowchart of generating real-time data objects and web recommendations in dependence upon user-generated web customizations and an offline evolved candidate space in accordance with one implementation of the technology disclosed.

FIG. 12 illustrates a flowchart of generating real-time data objects and web recommendations in dependence upon user-generated web customizations and an offline evolved candidate space in accordance with one implementation of the technology disclosed. Flowchart in FIG. 12 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 12. Multiple actions can be combined in some implementations. For convenience, this flowchart is described with reference to the system that carries out a method. The system is not necessarily part of the method.

At action 1210, the method includes iteratively receiving data object images of a product customized and/or selected by a user, each data object image having a plurality of dimensions with at least some dimensions of the data object image modified by the user.

At action 1220, the method includes generating recommendations, at each iteration, for display to the user in dependence upon an embedding space identifying a plurality of preselected data object images.

At action 1230, the method includes representing the data object images of the customized and/or selected product in the embedding space.

At action 1240, the method includes identifying a plurality of preselected data object images that are nearest-neighbors to the data object image representations in the embedding space.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as training system, training, definitive metrics, perception metrics, percept filter, definitive filter, neural network system, and others.

In one implementation, the embedding space identifies the plurality of preselected data object images using a trained neural network system with a plurality of neural networks trained to achieve conformity with different predefined goals in dependence upon respective thresholds.

In one implementation, the predefined goal is visual similarity of image features of the data object images with image features of a set of target image representations.

In one implementation, the predefined goal is visual conformance of image features of the data object images with a set of perception metrics.

In one implementation, the embedding space identifies the plurality of preselected data object images using a rule-based percept filter that enforces visual conformance of image features of the data object images with a set of perception metrics.

Other implementations of the method described in this section can include a computer readable storage medium storing instructions in a non-transitory manner, which are executable by a processor to perform any of the methods described above. Yet another implementation of the method described in this section can include a system including memory and one or more processors operable to execute instructions, stored in the memory, to perform any of the methods described above.

Particular Implementations

We describe a system and various implementations for preparing a data object creation and recommendation database for use in a data object creation and recommendation system. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

In one implementation, the data object creation and recommendation system of the technology disclosed is cumulatively embodied in components of FIG. 1 or any combination thereof. For example, the training system 104 is the data object creation and recommendation system disclosed herein, according to one implementation.

In one implementation, the data object creation and recommendation database of the technology disclosed is cumulatively embodied in components of FIG. 1 or any combination thereof. For example, the candidate individuals 106 form the data object creation and recommendation database disclosed herein, according to one implementation.

In one implementation, the data object creation and recommendation system of the technology disclosed is cumulatively embodied in components of FIG. 2 or any combination thereof. For example, the neural network system 214 is the data object creation and recommendation system disclosed herein, according to one implementation. In another example, the (trained) goal one neural network 216 is the data object creation and recommendation system disclosed herein, according to one implementation. In yet another example, the (trained) goal two neural network 218 is the data object creation and recommendation system disclosed herein, according to one implementation.

In one implementation, the data object creation and recommendation database of the technology disclosed is cumulatively embodied in components of FIG. 1 or any combination thereof. For example, the individual dimensions 202, the simulated training data 206, the definitive training data 208, the random training data 209, the labeled training data 212, or any combination thereof form the data object creation and recommendation database disclosed herein, according to one implementation.

In one implementation, the data object creation and recommendation system of the technology disclosed is cumulatively embodied in components of FIG. 3 or any combination thereof. For example, the percept filter 302 is the data object creation and recommendation system disclosed herein, according to one implementation. In another example, the definitive filter 304 is the data object creation and recommendation system disclosed herein, according to one implementation.

In one implementation, the data object creation and recommendation database of the technology disclosed is cumulatively embodied in components of FIG. 4 or any combination thereof. For example, the production data 401 and the offline candidate space 408, or any combination thereof form the data object creation and recommendation database disclosed herein, according to one implementation.

In one implementation, the data object creation and recommendation system of the technology disclosed is cumulatively embodied in components of FIG. 5 or any combination thereof. For example, the procreation module 514 is the data object creation and recommendation system disclosed herein, according to one implementation. In another example, the competition module 510 is the data object creation and recommendation system disclosed herein, according to one implementation.

In one implementation, the data object creation and recommendation database of the technology disclosed is cumulatively embodied in components of FIG. 5 or any combination thereof. For example, the candidate population 508, winning individuals 512 and the offline candidate space 516, or any combination thereof form the data object creation and recommendation database disclosed herein, according to one implementation.

In one implementation, the data object creation and recommendation system of the technology disclosed is cumulatively embodied in components of FIG. 6 or any combination thereof. For example, the nearest-neighbor finder 606 is the data object creation and recommendation system disclosed herein, according to one implementation. In another example, the harvesting module 612 is the data object creation and recommendation system disclosed herein, according to one implementation.

In one implementation, the data object creation and recommendation database of the technology disclosed is cumulatively embodied in components of FIG. 6 or any combination thereof. For example, the live online customizations/selections 604, the nearest-neighbors database 610, the live online recommendations 614, and the offline candidate space 608, or any combination thereof form the data object creation and recommendation database disclosed herein, according to one implementation.

In one implementation, the data object creation and recommendation system of the technology disclosed is cumulatively embodied in components of FIG. 7 or any combination thereof. For example, the procreation module 708 is the data object creation and recommendation system disclosed herein, according to one implementation. In another example, the competition module 710 is the data object creation and recommendation system disclosed herein, according to one implementation. In yet another example, the harvesting module 716 is the data object creation and recommendation system disclosed herein, according to one implementation.

In one implementation, the data object creation and recommendation database of the technology disclosed is cumulatively embodied in components of FIG. 7 or any combination thereof. For example, the live online customizations/selections 704, the candidate population 706, the winning individuals 712, the live online recommendations 718, and the online candidate space 714, or any combination thereof form the data object creation and recommendation database disclosed herein, according to one implementation.

The technology disclosed, in other implementations, may not use neural networks, as those discussed above, and/or may use other/different machine learning-based systems and algorithms instead of, or in addition to, those listed above, such as support vector machines (SVM), hidden Markov models, Naïve Bayes classifier, adaptive Bayes classifier, decision trees, random forest, discriminant analysis, nearest neighbors (k-NN), linear regression, nonlinear regression, generalized linear models, adaptive neuro-fuzzy inference system, and others. In implementations of the technology, such other machine learning-based systems and algorithms can be trained to evaluate data objects for conformity with predefined goals such as conformity with target identities or image representations of a data object, such as the product brand (e.g., Adidas™ shoes), attractiveness, novelty, and others.

In one implementation, the technology disclosed presents a system for providing expanded data object correlations for user-generated web customizations. The system runs on numerous parallel processors. The system can be a computer-implemented system. The system can be a neural network-based system.

The system comprises an insertion module. The insertion module creates an initial plurality of candidate data object image representations by procreation in dependence upon a data object image having a plurality of dimensions. At least some dimensions of the data object image are modified by user-generated web customizations.

The system comprises a memory that stores a candidate population. The candidate population has the plurality of candidate data object image representations.

The system comprises an evaluation module. The evaluation module scores each of the candidate data object image representations for conformity with a predefined goal using a trained neural network system and/or a rule rule-based percept filter.

The system comprises a competition module. The competition module discards candidate data object image representations from the candidate population which are scored as being less in conformity with the predefined goal than other candidate data object image representations in the candidate population.

The system comprises a procreation module. The procreation module adds new data object image representations to the candidate population by procreation in dependence upon the candidate data object image representations not discarded by the competition module.

The system comprises a control module. The control module iterates the evaluation module, the competition module, and the procreation module until the competition module yields a candidate pool of candidate data object image representations not yet discarded but which satisfy a convergence condition.

The system comprises a harvesting module. The harvesting module provides as recommendation, for display to a user, at least one of the data object images represented in the candidate pool of candidate data object image representations not selected for discarding but which satisfy the convergence condition.

This system implementation and other systems disclosed optionally include one or more of the following features. System can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

Procreating the data object image with the plurality of dimensions can further comprise mutating one or more dimension values of the dimensions.

The data object image can be selected from a recommended collection of data object images that was presented toward to the user.

The user-generated web customizations can be manual modifications of one or more image features of a prior data object image.

The prior data object image can be an image that was previously recommended toward the user. The prior data object image can be an image that was previously customized and/or selected by the user.

The procreation can further comprise crossing-over two or more parent candidate data object image representations not discarded by the competition module. In another implementation, the procreation can further comprise (1) crossing-over two or more parent candidate data object image representations not discarded by the competition module and (2) mutating a resulting child data object image representation procreated by the crossing-over.

The predefined goal can be visual similarity of image features of the image representations with image features of a set of target image representations. In another implementation, the predefined goal can be visual conformance of image features of the image representations with a set of perception metrics.

The rule-based percept filter can enforce visual conformance of image features of the image representations with a set of perception metrics. The trained neural network system can further comprise a plurality of neural networks trained to achieve conformity with different predefined goals in dependence upon respective thresholds.

Each of the features discussed in this particular implementation section for other system and method implementations apply equally to this system implementation. As indicated above, all the other features are not repeated here and should be considered repeated by reference.

Other implementations may include a non-transitory computer readable storage medium storing instructions executable by a processor to perform actions of the system described above.

In another implementation, the technology disclosed presents a data object creation and recommendation system. The system runs on numerous parallel processors. The system can be a computer-implemented system. The system can be a neural network-based system.

The system iteratively receives data object images of a product customized and/or selected by a user. Each data object image has a plurality of dimensions. At least some dimensions of the data object image are modified by the user.

At each iteration, the system generates recommendations for display to the user in dependence upon an embedding space. The embedding space identifies a plurality of preselected data object images. It does so by representing the data object images of the customized and/or selected product in the embedding space and identifying a plurality of preselected data object images that are nearest-neighbors to the data object image representations in the embedding space.

Each of the features discussed in this particular implementation section for other system and method implementations apply equally to this system implementation. As indicated above, all the other features are not repeated here and should be considered repeated by reference.

The embedding space can identify the plurality of preselected data object images using a trained neural network system. The trained neural network system can have a plurality of neural networks trained to achieve conformity with different predefined goals in dependence upon respective thresholds. In another implementation, the embedding space can identify the plurality of preselected data object images using a rule-based percept filter that enforces visual conformance of image features of the data object images with a set of perception metrics.

The predefined goal can be visual similarity of image features of the data object images with image features of a set of target image representations. In another implementation, the predefined goal can be visual conformance of image features of the data object images with a set of perception metrics.

Other implementations may include a non-transitory computer readable storage medium storing instructions executable by a processor to perform actions of the system described above.

In yet another implementation, the technology disclosed presents a system for providing expanded data object correlations for user-generated web customizations. The system runs on numerous parallel processors. The system can be a computer-implemented system. The system can be a neural network-based system.

For each of a plurality of preliminary data object images, the system provides a representation of the image in conjunction with a respective conformity parameter indicating level of conformity of the image with a predefined goal.

To evaluate future data object image representations for conformity with the predefined goal (e.g., during a production or inference stage or a validation stage), the system trains a neural network system with the preliminary data object image representations in conjunction with their respective conformity parameters.

From a provided plurality of secondary data object image representations, the system selects a subset of secondary data object image representations in dependence upon the trained neural network system.

The system stores the image representations from the selected subset of secondary data object image representations in a tangible machine readable memory for use in a data object creation and recommendation system.

Each of the features discussed in this particular implementation section for other system and method implementations apply equally to this system implementation. As indicated above, all the other features are not repeated here and should be considered repeated by reference.

Other implementations may include a non-transitory computer readable storage medium storing instructions executable by a processor to perform actions of the system described above.

In another implementation, the technology disclosed presents a method for providing expanded data object correlations for user-generated web customizations. The method can be a computer-implemented method. The method can be a neural network-based method.

The method includes creating an initial plurality of candidate data object image representations by procreation in dependence upon a data object image having a plurality of dimensions. At least some dimensions of the data object image are modified by user-generated web customizations.

The method includes storing a candidate population having the plurality of candidate data object image representations.

The method includes scoring each of the candidate data object image representations for conformity with a predefined goal using a trained neural network system and/or a rule rule-based percept filter.

The method includes discarding candidate data object image representations from the candidate population which are scored as being less in conformity with the predefined goal than other candidate data object image representations in the candidate population.

The method includes adding new data object image representations to the candidate population by procreation in dependence upon the candidate data object image representations not discarded.

The method includes iterating the scoring, the discarding, and the adding until the discarding yields a candidate pool of candidate data object image representations not yet discarded but which satisfy a convergence condition.

The method includes providing as recommendation, for display to a user, at least one of the data object images represented in the candidate pool of candidate data object image representations not selected for discarding but which satisfy the convergence condition.

Each of the features discussed in this particular implementation section for other system and method implementations apply equally to this method implementation. As indicated above, all the other features are not repeated here and should be considered repeated by reference.

Other implementations may include a non-transitory computer readable storage medium (CRM) storing instructions executable by a processor to perform the method described above. Yet another implementation may include a system including memory and one or more processors operable to execute instructions, stored in the memory, to perform the method described above.

In another implementation, the technology disclosed presents a method of providing a data object creation and recommendation system. The method can be a computer-implemented method. The method can be a neural network-based method.

The method includes iteratively receiving data object images of a product customized and/or selected by a user. Each data object image has a plurality of dimensions. At least some dimensions of the data object image are modified by the user.

The method includes generating recommendations, at each iteration, for display to the user in dependence upon an embedding space identifying a plurality of preselected data object images. This is achieved by representing the data object images of the customized and/or selected product in the embedding space and identifying a plurality of preselected data object images that are nearest-neighbors to the data object image representations in the embedding space.

Each of the features discussed in this particular implementation section for other system and method implementations apply equally to this method implementation. As indicated above, all the other features are not repeated here and should be considered repeated by reference.

Other implementations may include a non-transitory computer readable storage medium (CRM) storing instructions executable by a processor to perform the method described above. Yet another implementation may include a system including memory and one or more processors operable to execute instructions, stored in the memory, to perform the method described above.

In yet further implementation, the technology disclosed presents a method of providing expanded data object correlations for user-generated web customizations. The method can be a computer-implemented method. The method can be a neural network-based method.

The method includes, for each of a plurality of preliminary data object images, providing a representation of the image in conjunction with a respective conformity parameter indicating level of conformity of the image with a predefined goal.

The method includes training a neural network system with the preliminary data object image representations in conjunction with their respective conformity parameters, to evaluate future data object image representations for conformity with the predefined goal (e.g., during a production or inference stage or a validation stage).

The method includes selecting a subset of secondary data object image representations, from a provided plurality of secondary data object image representations, in dependence upon the trained neural network system.

The method includes storing the image representations from the selected subset of secondary data object image representations in a tangible machine readable memory for use in a data object creation and recommendation system.

Each of the features discussed in this particular implementation section for other system and method implementations apply equally to this method implementation. As indicated above, all the other features are not repeated here and should be considered repeated by reference.

Other implementations may include a non-transitory computer readable storage medium (CRM) storing instructions executable by a processor to perform the method described above. Yet another implementation may include a system including memory and one or more processors operable to execute instructions, stored in the memory, to perform the method described above.

In one implementation, the technology disclosed presents a system for preparing a data object creation and recommendation database. The system runs on numerous parallel processors. The system can be a computer-implemented system. The system can be a neural network-based system.

The system comprises a labelling module. For each of a plurality of preliminary data object images, the labelling module provides a representation of the image in conjunction with a respective conformity parameter indicating level of conformity of the image with a predefined goal.

The system comprises a training system. The training system trains a neural network system with the preliminary data object image representations in conjunction with their respective conformity parameters, to evaluate future data object image representations for conformity with the predefined goal. The evaluation can occur at a production or inference stage or a validation stage.

The system comprises a competition module. The competition module selects a subset of secondary data object image representations, from a provided plurality of secondary data object image representations, in dependence upon the trained neural network system.

The system comprises a harvesting module. The harvesting module stores the image representations from the selected subset of secondary data object image representations in a tangible machine readable memory for use in a data object creation and recommendation system.

This system implementation and other systems disclosed optionally include one or more of the following features. System can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

The data object images can be simulated images comprising simulated training data. The data object images can be conforming real-world (wild) images comprising definitive training data. In other implementations, the data object images can be non-conforming real-world (wild) images comprising definitive training data.

The representation of the image can be a feature vector. In another implementation, the representation of the image can be a red-green-blue (RGB) image. In yet another implementation, the representation of the image can be a depth map. In yet further implementation, the representation of the image can be a color image.

The predefined goal can be visual similarity of image features of the image representations with image features of a set of target image representations. In other implementations, the predefined goal can be visual conformance of image features of the image representations with a set of perception metrics.

The respective conformity parameter indicating level of conformity of the image with the predefined goal can be manually set in dependence upon crowdsourced intelligence.

In yet other implementations, the predefined goal can be novelty of image features of the image representations relative to images features of other image representations.

The neural network system can further comprise a plurality of neural networks trained to achieve conformity with different predefined goals in dependence upon respective thresholds.

The system can select a subset of best conforming image representations from a set of conforming image representations identified in dependence upon the trained neural network system.

The plurality of secondary data object image representations can be generated randomly using simulated images. In other implementations, the plurality of secondary data object image representations can be generated randomly using real-world (wild) images.

The system can comprise a rule-based percept filter. The system can apply the rule-based percept filter to the preliminary data object image representations for training the neural network system. In such an implementation, the percept filter can enforce visual conformance of image features of the image representations with a set of perception metrics.

In another implementation, the system can select the subset of secondary data object image representations in dependence upon a rule-based percept filter. In such an implementation, the percept filter can enforce visual conformance of image features of the image representations with a set of perception metrics.

The system can select the secondary data object image representations in dependence upon a genetic algorithm. In such an implementation, the system can (1) instantiate a candidate population of candidate secondary data object image representations, (2) evaluate each of the candidates in the candidate population using the trained neural network system, (3) develop a conformance metric for each of the candidates undergoing the evaluation, (4) select candidates undergoing the evaluation for discarding from the candidate population in dependence upon the developed conformance metric, (5) add to the candidate population new candidates procreated in dependence upon a set of at least one parent candidate from the candidate population not yet selected for discarding, and (6) iterate the evaluation, the discarding, and the adding until the after a pool of candidates not yet discarded but which satisfy a convergence condition is identified.

The system can store the image representations from the selected subset of secondary data object image representations by embedding the image representations in an embedding space. The embedding space can be a metric space. The system can store, in the embedding space, the images representations along with corresponding data object images.

The system can iteratively receive data object images of a product customized by a user. Each data object image can have a plurality of dimensions. At least some dimensions of the data object image can be modified by the user. The system can generate nearest-neighbor recommendations, at each iteration, for frontend display to the user in dependence upon the subset of secondary data object image representations identified in an embedding space.

Each of the features discussed in this particular implementation section for other system and method implementations apply equally to this system implementation. As indicated above, all the other features are not repeated here and should be considered repeated by reference.

Other implementations may include a non-transitory computer readable storage medium storing instructions executable by a processor to perform actions of the system described above.

In another implementation, the technology disclosed presents a method of preparing a data object creation and recommendation database. The method can be a computer-implemented method. The method can be a neural network-based method.

The method includes for each of a plurality of preliminary data object images, providing a representation of the image in conjunction with a respective conformity parameter indicating level of conformity of the image with a predefined goal.

The method includes training a neural network system with the preliminary data object image representations in conjunction with their respective conformity parameters, to evaluate future data object image representations for conformity with the predefined goal.

The method includes selecting a subset of secondary data object image representations, from a provided plurality of secondary data object image representations, in dependence upon the trained neural network system.

The method includes storing the image representations from the selected subset of secondary data object image representations in a tangible machine readable memory for use in a data object creation and recommendation system.

Each of the features discussed in this particular implementation section for other system and method implementations apply equally to this method implementation. As indicated above, all the other features are not repeated here and should be considered repeated by reference.

Other implementations may include a non-transitory computer readable storage medium (CRM) storing instructions executable by a processor to perform the method described above. Yet another implementation may include a system including memory and one or more processors operable to execute instructions, stored in the memory, to perform the method described above.

Computer System

Figure 13:
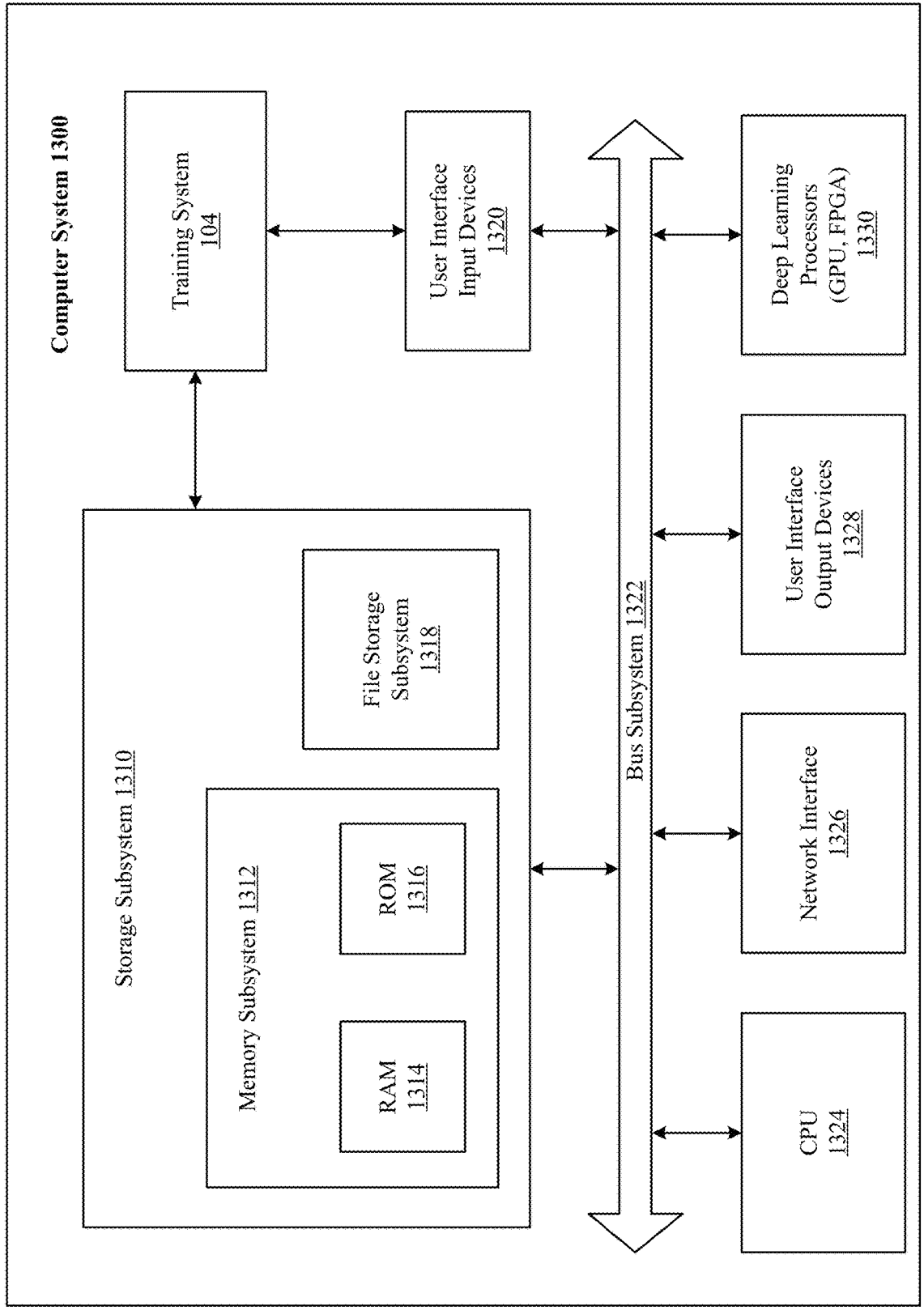
FIG. 13 is a simplified block diagram of a computer system that can be used to implement the technology disclosed.

FIG. 13 is a simplified block diagram of a computer system 1300 that can be used to implement the technology disclosed. Computer system 1300 includes at least one central processing unit (CPU) 1324 that communicates with a number of peripheral devices via bus subsystem 1322. These peripheral devices can include a storage subsystem 1310 including, for example, memory devices and a file storage subsystem 1318, user interface input devices 1320, user interface output devices 1328, and a network interface subsystem 1326. The input and output devices allow user interaction with computer system 1300. Network interface subsystem 1326 provides an interface to outside networks, including an interface to corresponding interface devices in other computer systems.

In one implementation, at least the training system 104 is communicably linked to the storage subsystem 1310 and to user interface input devices 1320.

User interface input devices 1320 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1300.

User interface output devices 1328 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1300 to the user or to another machine or computer system.

Storage subsystem 1310 stores programming and data constructs that provide the functionality of some or all of the modules and methods described herein. These software modules are generally executed by deep learning processors 1330.

Deep learning processors 1330 can be graphics processing units (GPUs) or field-programmable gate arrays (FPGAs). Deep learning processors 1330 can be hosted by a deep learning cloud platform such as Google Cloud Platform™, Xilinx™, and Cirrascale™. Examples of deep learning processors 1330 include Google's Tensor Processing Unit (TPU)™, rackmount solutions like GX4 Rackmount Series™, GX8 Rackmount Series™, NVIDIA DGX-1™, Microsoft' Stratix V FPGA™, Graphcore's Intelligent Processor Unit (IPU)™, Qualcomm's Zeroth Platform™ with Snapdragon Processors™, NVIDIA's Volta™, NVIDIA's DRIVE PX™, NVIDIA's JETSON TX1/TX2 MODULE™, Intel's Nirvana™, Movidius VPU™, Fujitsu DPI™, ARM's DynamicIQ™, IBM TrueNorth™, and others.

Memory subsystem 1312 used in the storage subsystem 1310 can include a number of memories including a main random access memory (RAM) 1314 for storage of instructions and data during program execution and a read only memory (ROM) 1316 in which fixed instructions are stored. A file storage subsystem 1318 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1318 in the storage subsystem 1310, or in other machines accessible by the processor.

Bus subsystem 1322 provides a mechanism for letting the various components and subsystems of computer system 1300 communicate with each other as intended. Although bus subsystem 1322 is shown schematically as a single bus, alternative implementations of the bus subsystem can use multiple busses.

Computer system 1300 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1300 depicted in FIG. 13 is intended only as a specific example for purposes of illustrating the preferred embodiments of the present invention. Many other configurations of computer system 1300 are possible having more or less components than the computer system depicted in FIG. 13.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "specify" is used herein to mean the same as "identify".

As used herein, a given signal, event or value is "in dependence upon" a predecessor signal, event or value of the predecessor signal, event or value influenced by the given signal, event or value. If there is an intervening processing element, step or time period, the given signal, event or value can still be "in dependence upon" the predecessor signal, event or value. If the intervening processing element or step combines more than one signal, event or value, the signal output of the processing element or step is considered "in dependence upon" each of the signal, event or value inputs. If the given signal, event or value is the same as the predecessor signal, event or value, this is merely a degenerate case in which the given signal, event or value is still considered to be "in dependence upon" or "dependent on" or "based on" the predecessor signal, event or value. "Responsiveness" of a given signal, event or value upon another signal, event or value is defined similarly.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

What is claimed is:

1. A computer-implemented system, running on numerous parallel processors, for providing expanded data object correlations for user-generated web customizations, comprising:
   an insertion module that creates an initial plurality of candidate data object image representations by procreation in dependence upon a data object image having a plurality of dimensions, with at least some dimensions of the data object image modified by user-generated web customizations;
   a memory storing a candidate population having the plurality of candidate data object image representations;
   an evaluation module that scores each of the candidate data object image representations for conformity with a predefined goal using a trained neural network system and/or a rule rule-based percept filter;
   a competition module that discards candidate data object image representations from the candidate population which are scored as being less in conformity with the predefined goal than other candidate data object image representations in the candidate population;
   a procreation module that adds new data object image representations to the candidate population by procreation in dependence upon the candidate data object image representations not discarded by the competition module;
   a control module that iterates the evaluation module, the competition module, and the procreation module until the competition module yields a candidate pool of candidate data object image representations not yet discarded but which satisfy a convergence condition; and
   a harvesting module providing as recommendation for display to a user at least one of the data object images represented in the candidate pool of candidate data object image representations not selected for discarding but which satisfy the convergence condition.

2. The system of claim 1, wherein procreating the data object image having the plurality of dimensions further comprises mutating one or more dimension values of the dimensions.

3. The system of claim 1, wherein the data object image is selected from a recommended collection of data object images that was presented toward to the user.

4. The system of claim 1, wherein the user-generated web customizations are manual modifications of one or more image features of a prior data object image.

5. The system of claim 4, wherein the prior data object image is one previously recommended toward the user.

6. The system of claim 4, wherein the prior data object image is one previously customized and/or selected by the user.

7. The system of claim 1, wherein the procreation further comprises crossing-over two or more parent candidate data object image representations not discarded by the competition module.

8. The system of claim 1, wherein the procreation further comprises crossing-over two or more parent candidate data object image representations not discarded by the competition module and mutating a resulting child data object image representation procreated by the crossing-over.

9. The system of claim 1, wherein the predefined goal is visual similarity of image features of the image representations with image features of a set of target image representations.

10. The system of claim 1, wherein the predefined goal is visual conformance of image features of the image representations with a set of perception metrics.

11. The system of claim 1, wherein the rule-based percept filter enforces visual conformance of image features of the image representations with a set of perception metrics.

12. The system of claim 1, wherein the trained neural network system further comprises a plurality of neural networks trained to achieve conformity with different predefined goals in dependence upon respective thresholds.

13. A computer-implemented method of providing expanded data object correlations for user-generated web customizations, including:
   creating an initial plurality of candidate data object image representations by procreation in dependence upon a data object image having a plurality of dimensions, with at least some dimensions of the data object image modified by user-generated web customizations;
   storing a candidate population having the plurality of candidate data object image representations;
   scoring each of the candidate data object image representations for conformity with a predefined goal using a trained neural network system and/or a rule rule-based percept filter;
   discarding candidate data object image representations from the candidate population which are scored as being less in conformity with the predefined goal than other candidate data object image representations in the candidate population;
   adding new data object image representations to the candidate population by procreation in dependence upon the candidate data object image representations not discarded;
   iterating the scoring, the discarding, and the adding until the discarding yields a candidate pool of candidate data object image representations not yet discarded but which satisfy a convergence condition; and
   providing as recommendation for display to a user at least one of the data object images represented in the candidate pool of candidate data object image representations not selected for discarding but which satisfy the convergence condition.

14. A non-transitory, computer-readable medium having computer executable instructions that implement the method of claim 13.

* * * * *